United States Patent [19]
Yamaguchi et al.

[11] Patent Number: 4,888,814
[45] Date of Patent: Dec. 19, 1989

[54] PATTERN RECOGNITION APPARATUS USING OSCILLATING MEMORY CIRCUITS

[75] Inventors: Youko Yamaguchi; Hiroshi Shimizu, both of Tokyo, Japan

[73] Assignee: Research Development Corporation of Japan, Tokyo, Japan

[21] Appl. No.: 314,301

[22] Filed: Feb. 23, 1989

Related U.S. Application Data

[63] Continuation of Ser. No. 158,779, Sep. 24, 1987, abandoned.

[30] Foreign Application Priority Data

Feb. 22, 1987 [JP]  Japan ................................. 62-38883
Sep. 24, 1987 [JP]  Japan ............................... 62-239541

[51] Int. Cl.$^4$ ............................................. G06K 9/48
[52] U.S. Cl. ........................................ 382/21; 382/17; 382/64
[58] Field of Search ..................... 382/21, 17, 29, 64

[56] References Cited

U.S. PATENT DOCUMENTS

| | | | |
|---|---|---|---|
| 3,297,993 | 1/1967 | Clapper | 382/22 |
| 3,482,211 | 12/1969 | Claris et al. | 382/17 |
| 3,509,534 | 4/1970 | Partin | 382/17 |
| 3,629,849 | 12/1971 | Sauvan | 382/21 |
| 4,710,964 | 12/1987 | Yamaguchi et al. | 382/17 |
| 4,747,152 | 5/1988 | Knutsson et al. | 382/21 |
| 4,760,603 | 7/1988 | Tsuda et al. | 382/14 |

Primary Examiner—Leo H. Boudreau
Assistant Examiner—Yon Jung
Attorney, Agent, or Firm—Kerkam, Stowell, Kondracki & Clarke

[57] ABSTRACT

A pattern recognition system comprises first and second cell blocks each composed of a number of nonlinear oscillators arranged in a multi-layer matrix. The nonlinear oscillators in each layer of the first cell block are coupled so as to be excited by a corresponding bit of a two-dimensional bit pattern, and are coupled to adjacent nonlinear oscillators in the same layer so as to mutually emphasize the oscillation in a predetermined direction different from those predetermined for the other layers, so that in each of the layers, there are selectively excited the nonlinear oscillators corresponding to a continuous line segment contained in the bit pattern and aligned in the excitation emphasizing direction of that layer. On the other hand, the nonlinear oscillators in each layer of the second cell block are coupled to a corresponding group of a plurality of nonlinear oscillators of a corresponding layer of the first cell block and are coupled to adjacent nonlinear oscillators in the same layer such that in each of the layers, there are selectively excited only the nonlinear oscillators corresponding to an end of a continuous line segment contained in the bit pattern. A memory composed of a plurality of nonlinear oscillators is selectively excited by the exciting nonlinear oscillators of the first and second cell blocks, whereby the nonlinear oscillators corresponding to an exciting pattern of the exciting nonlinear oscillators of the first and second cell blocks oscillate at a frequency inherent to a given pattern.

4 Claims, 38 Drawing Sheets

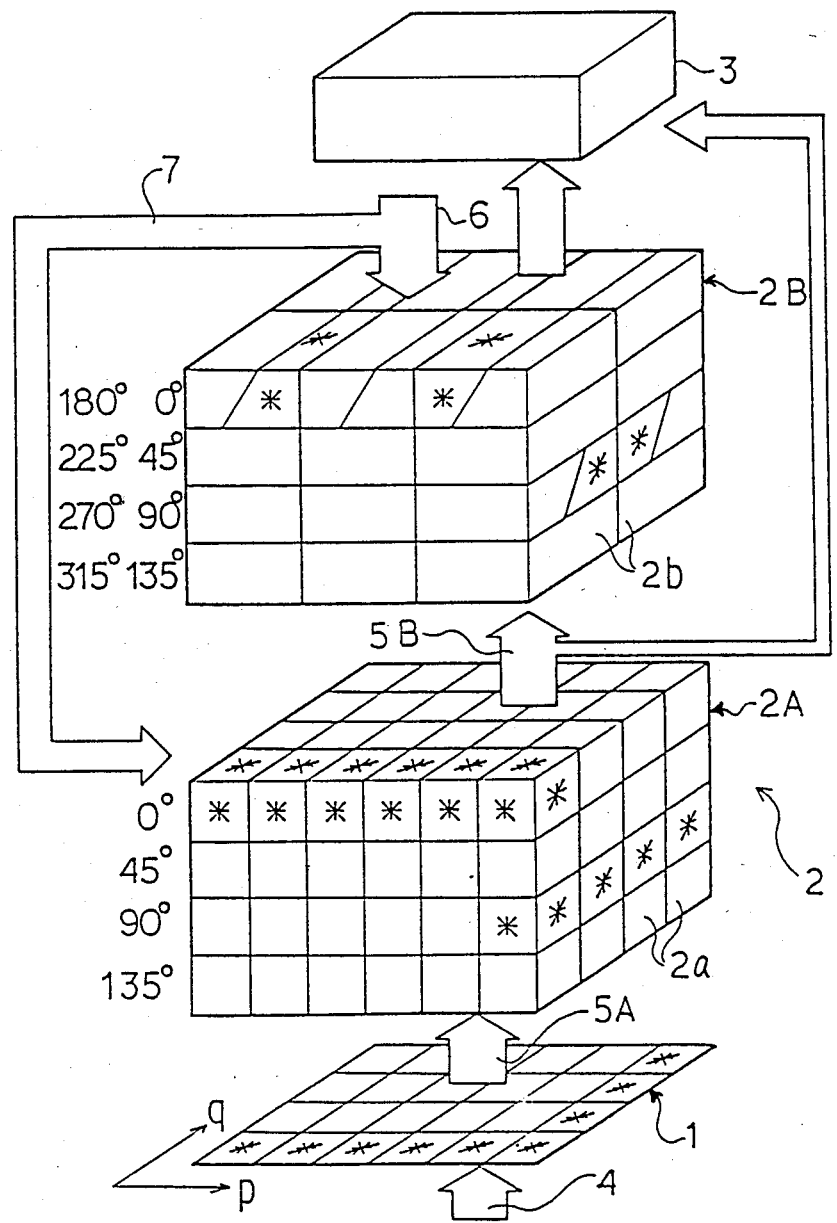

FIGURE 1A
0° 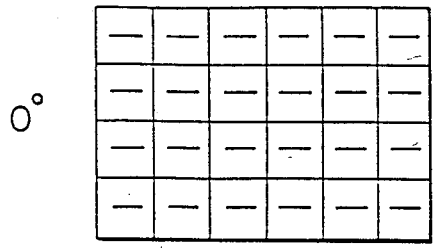
45° 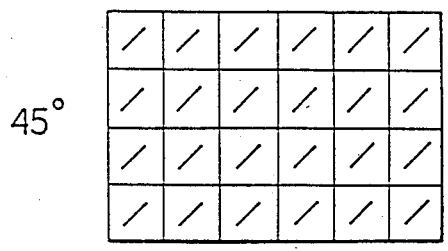
90° 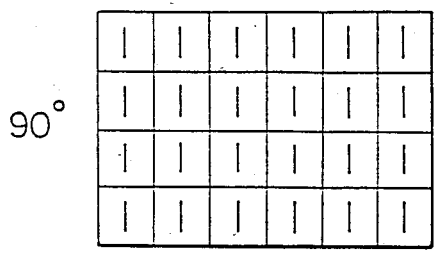
135° 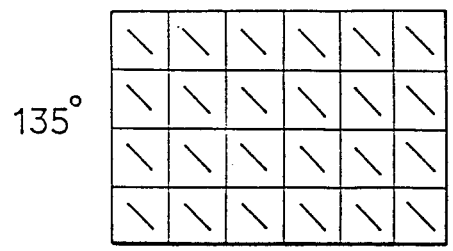

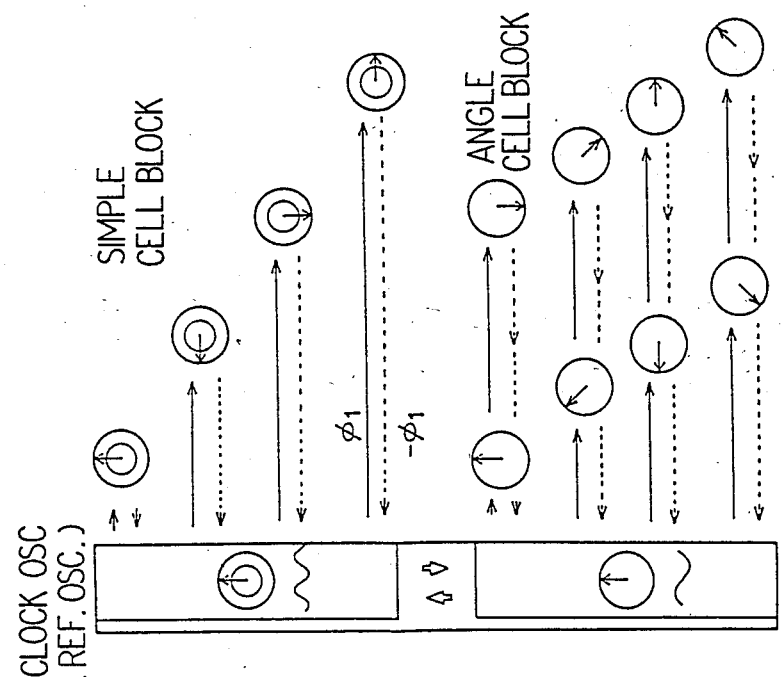
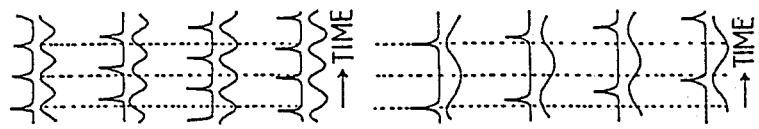
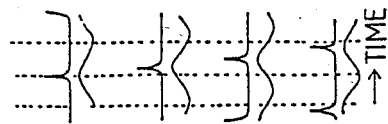
FIGURE 10A

FIGURE 23

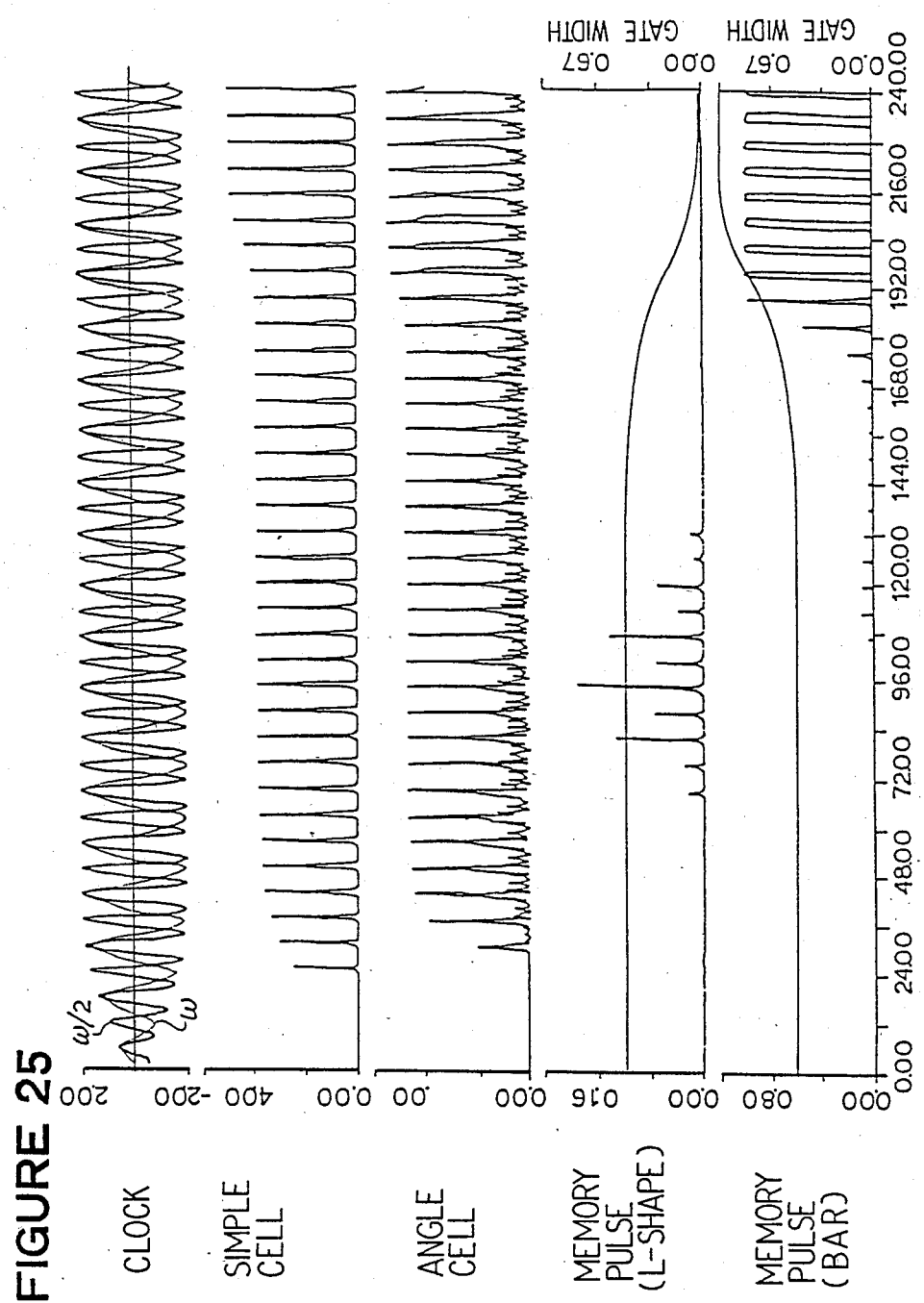

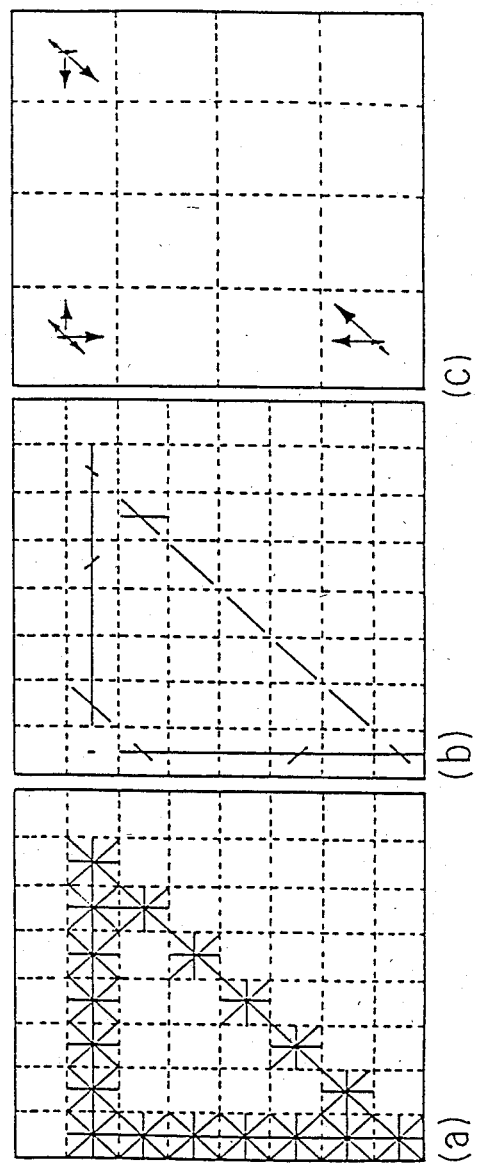
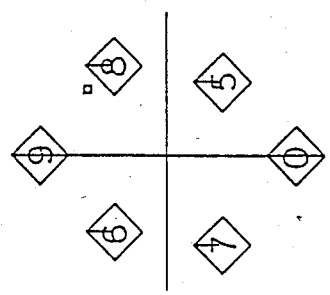
FIGURE 30
FIGURE 29

PATTERN RECOGNITION APPARATUS USING OSCILLATING MEMORY CIRCUITS

This is a continuation of application Ser. No. 158,779, filed Sept. 24, 1987, now abandoned.

BACKGROUND OF THE INVENTION

1. Field of the Invention

The present invention relates to a pattern recognition system, and more specifically to a general pattern recognition system capable of recognizing a given pattern in an analog manner without regard to the size and the direction of the whole of the given pattern.

2. Description of Relates Art

At present, so-called pattern recognition systems are widely used in an industrial field, for example as apparatuses for reading letters and systems for sorting components or parts. The feature of recognition method common to the conventional systems is to firstly extract various characteristics, which are commonly contained in a group of objects to be recognized, from the input pattern data, and then to categorize on the basis of the extracted characteristics.

The processing part of such recognition systems comprises a digital processor and a special circuit which quantitatively extracts specific characteristics, such as a high speed Fourier transformation circuit. The program for the digital processor can be designed according to the objects for recognition. Such a recognition system is specialized to meet the very first industrial demand for a high-speed recognition.

On the other hand, the specialization of the recognition system makes it necessary to design an system and a program for each recognition object category. As a result, the related techniques are more specialized, and design and modification works have become more complicated. Furthermore, the complication of category classification processing lowers the reliability of recognition results, resulting in more difficult quality control of products manufactured in the production system using the pattern recognition system.

On the viewpoint of tho manufacture's side, this follows that a high degree of design work is required for each of specifications of orders received, and that the cost of product including training of engineers becomes higher.

On the viewpoint of the user's side, there exist disadvantages on the technical point and the cost in use such that the technical information on the recognition objects themselves which are wanted to be held only at the user can flow out to the maker's side, and such that the user is forced to frequently change the system to a new model with improved function.

As above-described, the pattern recognition system has encountered with disadvantages of the specialization and complication.

In this situation, general purpose pattern recognition systems have been proposed in Japanese Patent Application Laid-open Nos. SHO 61-127,075 and SHO 61-127,076 and U.S. Pat. No. 4,710,964, which systems are capable of recognizing a given pattern in an analog manner without regard to the size and the direction of the whole of the given pattern.

These pattern recognition systems are such that the dependency of the construction of the softwares and the hardwares upon the kinds of objects to be recognized has been greatly decreased. Therefore, it has become possible for the maker to mass-manufacture a small kinds of systems, which would enable decrease of the cost and the increase of the reliability. On the other hand, the user can accumulate data concerning the pattern of objects to be recognized, indepandently of an outside such as the maker. In other words, these pattern recognition systems have succeeded in achieving the objects of the inventions. However, the these recognition systems could not still be satisfied, because these systems cannot discriminate patterns composed of two diagonal line segments such as a cross or plus-sign pattern, a L-shaped pattern and a T-shaped pattern, and a pair of parallel line segments adjacent to each other.

Further, the above mentioned pattern recognition system cannot discriminate a graphic pattern composed of a closed line, such as a triangle and a rectangle.

SUMMARY OF THE INVENTION

Accordingly, it is one object of the present invention to provide a general pattern recognition system having sòlved the above mentioned various disadvantages of the conventional apparatus.

Another object of the present invention is to provide such a novel pattern recognition system that the structures of software and hardware are quite independent of the recognition object category.

A still another object of the present invention is to provide such a pattern recognition system capable of recognizing a given pattern in an analog manner without regard to the size and the direction of the whole of the given pattern and also capable of discrimination a corner configuration.

A still further object of the present invention is to provide such a pattern recognition system capable of recognizing discriminating a graphic pattern composed of a closed line, such as a triangle and a rectangle.

Such specification and complication attendant upon the improvement of accuracy of the pattern recognition system cannot be avoided as long as the conventional recognition method is adopted in which various characteristics common to a group of recognition objects are extracted out of input pattern data in the operational way and then collated with reference data sc as to be finally categorized.

As discussed in the patents referred above, the recognition method of a human beings and other creatures is surely quite different from the data processing in the conventional pattern recognition system.

A living body receives, in the five senses including the sense of sight, various stimuli from the external environment, then interprets them according to the experience making use of a brain and a nervous plexus, and finally memorizes them if necessary. A living body can also give a certain interpretation to inexperienced matters. Moreover, the interpretation is not only based on the incoming but also is influenced by the internal condition such as the internal secretion and sickness. There is no doubt at all that the above special recognition capacity makes it possible for the life to withstand for such a long time as several $10^9$ years without any discontinuity.

The structure of the brain and nervous plexus having the above-mentioned capacity is partially specialized for each recognition object. The most part of the structure, however, is a kind of large-scaled nervous system composed of a large number of single-structural neuropils interconnected with each other. According to the cranial nerve physiology each of nerve cells organizing the neuropil receives the electrical stimuli from several thousands to several ten thousands of other nerve cells, and generates electrical impulses to itself and to a large number of other nerve cells. The generation of the electrical impulses is called "firing".

The condition of such firing of nerve cells depends on the internal condition of the cells themselves and the stimuli inputted. On the other hand, since it is considered that the whole of a brain executes a certain recognition processing, it can be understood that the firing of even a single nerve cell can be a result of the partial interpretation processing.

On the viewpoint of the other side, it seems that the above nerve cells interchanges the electrical impulses each other and the method for application of such impulses is divided into two manners: the first is to restrain the firing and the second is to facilitate the firing. The brain can, therefore, be regarded as having a circuit network having positive feedback control circuits, negative feedback control circuits and oscillation circuits. In fact, it can be understood that the brain performs the recognition processing and other activities while oscillating, because there are observed the electrical brain waves showing the condition of activity as the whole.

Furthermore, the human brain is quite complicated and composed of more than $10^8$ of nerve cells. It is known from the anatomical viewpoint that these cells are interconnected each other, not in a random way but in a repeated way in which the same patterns are repeated in the order of several tens to several thousands.

The above description shows the characteristics of the hardware of the brain a the pattern recognition system.

The description will be hereinafter devoted to the aspect as the software of the action of the brain. The change in spatial and time distribution of the firing of the neuropils caused by the stimuli from the inside and outside of a living body, seems to show the progress of the interpretation processing inside the brain, that is, the recognition software and the transfer of the information processed therein. The features of a brain different from a digital processor are that: (1) the program and data are not stored separately, (2) data processing is executed in completely parallel at various local neuropils and the output can be obtained in harmony as a whole.

A detailed description is made hereinafter for the program and data not being stored separately. The program and data should be regarded to be substantially stored separately in a digital processor, because the processor clearly distinguishes between the data and the instruction in the course of execution of processing based on the program and data although they are stored mixedly in a memory device. On the other hand, a brain is neither a digital processor of such stored program type nor a discrete logical circuit in the conception opposite to the above digital processor. The neuropils have a special structure so that the progress of data processing may produce the new experience and consequently a new data processing structure.

As far as the parallel data processing on neuropils in harmony as the whole are concerned, a total evaluation is given by the following characteristics. Since the respective firing conditions in local groups of nerve cells are in cooperation to produce one overall harmony, each group of local nerve cells has somehow the information concerning the whole condition and the object to be recognized. Each nerve cell group receives the information from other nerve cell groups with a time delay in comparison with the information which the nerve cell group itself receives from external. Such a feature is a kind of pattern recognition in a wide sense including not only visual recognition but also other recognitions such as audio recognition, and moreover, has no substantial disadvantages inherent to the conventional pattern recognition system of the digital processor type. Namely, since the store of recognition experiences automatically produces an improved recognition software for possible next recognition operation, it is not necessary to give a new software for the next object given from outside. And, although the brain or each neuropil is composed of repeated units of the same structure on the viewpoint of hardware, the brain can cope with the change of the recognition function.

Paying attention to the remarkable pattern recognition capacity and their characteristic structure of a living body, the inventors have originated the pattern recognition system in accordance with the present invention.

Referring to FIG. 1 there is shown in the form of function blocks, the pattern recognition system in accordance with the present invention. The shown pattern recognition system comprises a pattern preprocessing unit 1, an information consolidator 2 composed of a first cell block 2A and a second cell block 2B, and a memory 3.

The input data obtained from a recognition object 4 is transformed into a two dimensional bit pattern called "elementary information" by the pattern preprocessing unit 1 and then inputted to the information consolidator 2.

The first cell block 2A of the consolidator 2 has a multilayer structure in which each layer is composed of a plurality of nonlinear oscillators 2a arranged in the form of a two dimensional matrix. The nonlinear oscillators of each layer are coupled through a bus 5A to the preprocessing unit 1 so that the nonlinear oscillators are excited by the corresponding bits of this bit pattern generated in the preprocessing unit 1, respectively. In addition, each nonlinear oscillator is interconnected to adjacent oscillators in the same matrix plane but only in a direction which is different from those of the other layers in such a manner that the oscillation of the respective oscillators is emphasized to each other. With this arrangement, in each of the matrix layers, there are selectively excited a series of nonlinear oscillators positioned in correspondence to a continuous line segment of the two bit pattern and in the same direction as that of the continuous line segment.

On the other hand, the second cell block 2B of the consolidator 2 also has a multilayer structure in which each layer is composed of a plurality of nonlinear oscillators 2b arranged in the form of a two dimensional matrix. The nonlinear oscillators of each layer are coupled through a bus 5B to the first cell block 2A so that the nonlinear oscillators are excited by the corresponding bits of the bit pattern generated. Further, similarly to the first cell block 2A, each nonlinear oscillator is interconnected to adjacent oscillators in the same matrix plane but only in a direction which is different from those of the other layers in such a manner that the oscillation of the respective oscillators is emphasized to each other. In each of the matrix layers, accordingly, there are selectively excited a series of nonlinear oscillators positioned in correspondence to a continuous line segment of the two bit pattern and in the same direction as that of the continuous line segment.

The memory 3 is composed of a plurality of nonlinear oscillators in the form of an array, which are connected to the first and second cell blocks 2A and 2B through a bus 6 and a bus 7, so that those oscillators are selectively excited in a mutual influence to the nonlinear oscillators of the first and second cell blocks 2A and 2B. As a result, oscillators of the memory 3 corresponding to the nonlinear oscillators 2a and 2b of the first and second cell blocks will oscillate at a frequency inherent to a given pattern outputted from the preprocessing unit 1.

Moreover, the input signal 4 is not limited in kind and can be any kind of information having any distinguishable characteristics such as sounds and visual images.

In the above mentioned pattern recognition system, the pattern preprocessing unit 1 analyses or transforms the input signal 4 and expands it into the two dimensional bit pattern with respect to the various properties such as length, position, and light and darkness.

In the example shown in FIG. 1, the input data is expanded into two-dimensional bit pattern (p, q). The figure also shows that as a two-dimensional bit pattern introduced from the input data 4 given in the pattern preprocessing unit 1, the change appears in the outputs of the corresponding elementary units marked "*" of elementary units 1a of the preprocessing unit 1. Namely, the distribution pattern reveals a inverted L-shaped pattern Such a distribution pattern is inputted as an elementary information signal 5 to the first cell block 2A of the information consolidator 2. The first cell block 2A transforms an output signal from the pattern preprocessing unit, 1 into a signal integrated in a time series, (that is, an signal changing with the time). As mentioned above, the first cell block 2A is composed of a stack of layers, each layer consisting of a plurality of elementary unit circuits 2a as seen from in FIG. 1. Hereinafter, the nonlinear oscillators used in the first and second cell blocks 2A and 2B and the memory 3 will be called "simple cells" or "angle cells".

As explained hereinbefore, the simple cells of the first cell block 2A are coupled through a bus 5A to the preprocessing unit 1 so that the simple cells are excited by the corresponding bits of the bit pattern generated in the preprocessing unit 1, respectively, and each simple cell is interconnected to adjacent simple cells in the same matrix plane so as to emphasize the oscillations of the simple cells only in a direction predetermined in the same matrix plane but different from directions determined for the other matrix planes. Therefore, the simple cells are reactive or responsive to the inclination of segments indicated by the marks "*" on the plane (p, q) in the preprocessing unit 1.

Each horizontal layer of the simple cells is the plane to which the condition of the plane (p, q) of the pattern preprocessing unit 1 is projected in parallel, and is here called "hyperplane". On the other hand, a line or column of simple cells on the vertical direction contains simple cells respectively corresponding to different inclinations (max. 180 degrees) of possible segments indicated by the marks "*" on the projected plane (p, q). Each column of simple cells is here called "hypercolumn". In the pattern recognition system in FIG. 1, the cells of each hypercolumn correspond to 0°, 45°, 90°, 135° respectively from above to below, as shown in FIG. 1A. Assuming that the input signal 5 given by the pattern preprocessing unit 1 is formed of the segments of the inclinations, 0° and 90°, simple cells designated with mark "*" in the first cell block 2A are reacting in response to the input data from the preprocessing unit 1.

There is no doubt at all that the distribution pattern of the reacting cells in the first cell block 2A reveals the characteristics inherent to the input signal 4. The reaction distribution pattern involves the absolute position of each reacting simple cell in the first cell block 2A (for example, the position in the threedimensional coordinates) and the relative positional relationship between reacting cells (for example, distance and direction).

On the other hand, as shown in FIG. 1B, the second cell block 2B has a multilayer structure having four stacked layers corresponding to 0° and 180°, 45° and 225°, 90° and 270°, 135° and 270°, respectively from above to below. Each of the stacked layers has the array of simple cell blocks, each of which is coupled to and excited by for example four simple cells of the corresponding plane of the first cell block 2A. But, the simple cells of the second cell block 2B can be coupled to the simple cells of the first cell block 2A in a one-to-one relation. Further, each of the simple cells of the second cell block 2B can be coupled to each one group consisting of simple cells of any integer number other than four.

As shown in FIG. 1, each simple cell of the second cell block 2B is composed of two portions or two subcells which are assigned to two completely opposite azimuths or orientations (for example, 0° and 180° in the uppermost layer in FIG. 1B), and each of which is coupled to a corresponding subcell of a adjacent simple cell in the assigned orientation so as to influence the oscillation of the adjacent simple cell.

Specifically, if each subcell of the simple cell in the second cell block 2B is excited by the corresponding simple cell of the first cell block 2A, the each subcell of the simple cell in the second cell block 2B operates to weaken a corresponding subcell of an adjacent simple cell in tho assigned orientation of the each subcell itself excited by the simple cell of the first cell block 2A. But, if each subcell of the simple cell in the second cell block 2B is not excited by the corresponding simple cell of the first cell block 2A, the each subcell of the simple cell in the second cell block 2B does influence on the oscillation of a corresponding subcell of an adjacent simple cell in the assigned orientation of the each subcell itself.

In the second cell block 2B shown in FIG. 1, each simple cell is shown as being halved by an inclined plane. In the uppermost plane, a righthand subcell of each simple cell is coupled to weaken the oscillation of a subcell of an adjacent simple cell in the orientation of 0° and a lefthand subcell of each simple cell is coupled to weaken the oscillation of a subcell of an adjacent simple cell in the orientation of 180°. Similarly, respective subcells of the simple cells of the other planes in the second cell block 2B are coupled. A pair of angles indicated at the left side of each plane of the second simple cell in FIG. 1 show the oscillation weakening orientations of the subcells in the respective planes. The righthand angle of the pair of angles at the left side of the each plane indicates the orientation in which a righthand subcell of each simple cell is coupled to weaken the oscillation of a subcell of an adjacent simple cell. The lefthand angle of the pair of angles at the left side of the each plane indicates the orientation in which a lefthand subcell of each simple cell is coupled to weaken the oscillation of a subcell of an adjacent simple cell.

Thus, in the second cell block 2B, some number of simple cells are excited by the corresponding simple cells of each plane in the first cell block 2A. But, because of the above mentioned weakening coupling, excitation is maintained in only simple cells corresponding to ends of line segments formed by the exciting simple cells in the respective planes of the first cell block 2A. Therefore, in the example shown in FIG. 1, only the simple cells corresponding to the ends of the two dimensional bit pattern are excited as designated with mark "*". Namely, in the uppermost plane, since the leftmost simple cell is not weakened from the orientation of 0°, the oscillation is maintained in the subcell of the leftmost simple cell assigned to the orientation of 0°. But, since the same leftmost simple cell in the same uppermost plane is weakened from the orientation of 180°, the oscillation is extinguished in the subcell of the leftmost simple cell assigned to the orientation of 180°. On the other hand, in the same uppermost plane, since the rightmost simple cell is not weakened from the orientation of 180°, the oscillation is maintained in the subcell of the rightmost simple cell assigned to the orientation of 180°. But, since the same rightmost simple cell in the same uppermost plane is weakened from the orientation of 0°, the oscillation is extinguished in the subcell of the rightmost simple cell assigned to the orientation of 0°.

Thus, the excitation of the simple cells of the first and second cell blocks 2A and 2B are transferred to the memory 3 so as to excite the memory 3. In addition, the excitation of the simple cells of the memory 3 itself is fed back to the corresponding simple cells of the first and second cell blocks 2A and 2B. Therefore, the first and second cell blocks 2A and 2B and the memory 3 are mutually influenced each other, so that certain simple cells in the memory 3, which are determined by the interaction between the input reacting pattern in the cell blocks 2A and 2B and the content of the memory 3, ultimately continue to oscillate. The ultimately oscillating simple cells in the memory 3 will give recognition of the given pattern.

In the case that the oscillation of the information consolidator 2 and the oscillation of the memory 3 are mutually entrained, it can be judged that the given pattern to be recognized is consistent with a pattern stored in the memory 3. But, if the oscillation of the information consolidator 2 and the oscillation of the memory 3 are not mutually entrained with the result that the oscillation in the memory is ultimately extinguished, it can be judged that the given pattern to be recognized is completely different from the pattern stored in the memory 3. Further, if the oscillation of the information consolidator 2 is entrained to the oscillation of the memory 3 so that the memory oscillates at a new frequency, it can be said that the memory 3 has recognized a new pattern which is not identical to but similar to the pattern stored in the memory 3.

As far as the nonlinear oscillation circuit is concerned, various types of circuit are well known and have been put into practice in various fields. The common characteristics of the existing nonlinear oscillating circuits is that they are able to generate quite complicated oscillating waves because the next following state is defined by the combination of the internal and external conditions of the circuit at each moment. Thus, each of simple cells is provided with a plurality of inputs for receiving signals from the external and a plurality of outputs for outputting signals to an external, and a plurality of such simple cells arc interconnected so as to form a nonlinear oscillating circuit network in which the respective cells are interfered with each other in a complicated way. The first and second cell blocks 2A and 2B of the information consolidator 1 and the memory 3 composed of such nonlinear oscillation circuit networks, respectively.

Therefore, the memory 3 is not of a digital type such as memory cells for a normal digital system, which stores the voltages corresponding to the values "1" and "0", but one in which oscillation condition becomes the content of memory itself. The fundamental structure of the memory is similar to that of the hypercolumn consisting of simple cells.

The simple cells of the memory 3 receive in parallel an exciting pattern through the buses 6 and 7 and compare the received pattern with the oscillating pattern which each simple cell has. The result of such comparison is transmitted to the information consolidator as the signal 7 so as to emphasize the oscillation of the corresponding reaction simple cells.

Thus, the above process is circularly repeated in a loop starting from the information consolidator 2, passing to the memory 3 and returning to the information consolidator 2. As a result, the oscillation is preferentially emphasized in the simple cells which are in higher agreement with the corresponding cells in the information consolidator, and on the other hand, the oscillation is finally weakened in the other unitary memories. Thus the recognition result is confirmed.

In other words, the principal feature of the present recognition processing relies on two kinds of memory functions: one is the function that the oscillation mode before interference of the nonlinear oscillation circuits is a main factor to decide the future oscillation mode; and the other is such a memory function that the oscillation pattern having been affected by the interference once can still remain. The present pattern recognition, therefore, is the one where the operation condition of the circuit involves both the content of the memory and the process of the information processing simultaneously.

The above and other objects, features and advantages of the present invention will be apparent from the following description of preferred embodiments of the invention with reference to the accompanying drawings.

BRIEF DESCRIPTION OF THE DRAWINGS

FIG. 1 is a function block diagram illustrating the fundamental idea involved in the pattern recognition system in accordance with the present invention;

FIG. 1A illustrates the directivity of the simple cells contained in the first cell block of the information consolidator of the pattern recognition system shown in FIG. 1;

FIG. 10A illustrates a simulated oscillation of the simple cell block and the angle cell block caused by the clock oscillator;

FIG. 23 illustrate the correspondence between the graphic patterns and the connection patterns of the memory oscillators;

FIG. 25 is a waveform diagram showing signals at various points in the pattern recognition operation shown in FIG. 24;

FIG. 29 is a pattern diagram similar to FIG. 24 but illustrating a third example of the operation of the second embodiment of the pattern recognition system;

FIG. 30 illustrates the phase relation of memory cells excited by the exciting angle cells in the pattern recognition operation shown in FIG. 29;

DESCRIPTION OF THE PREFERRED EMBODIMENTS

Figure 1B:
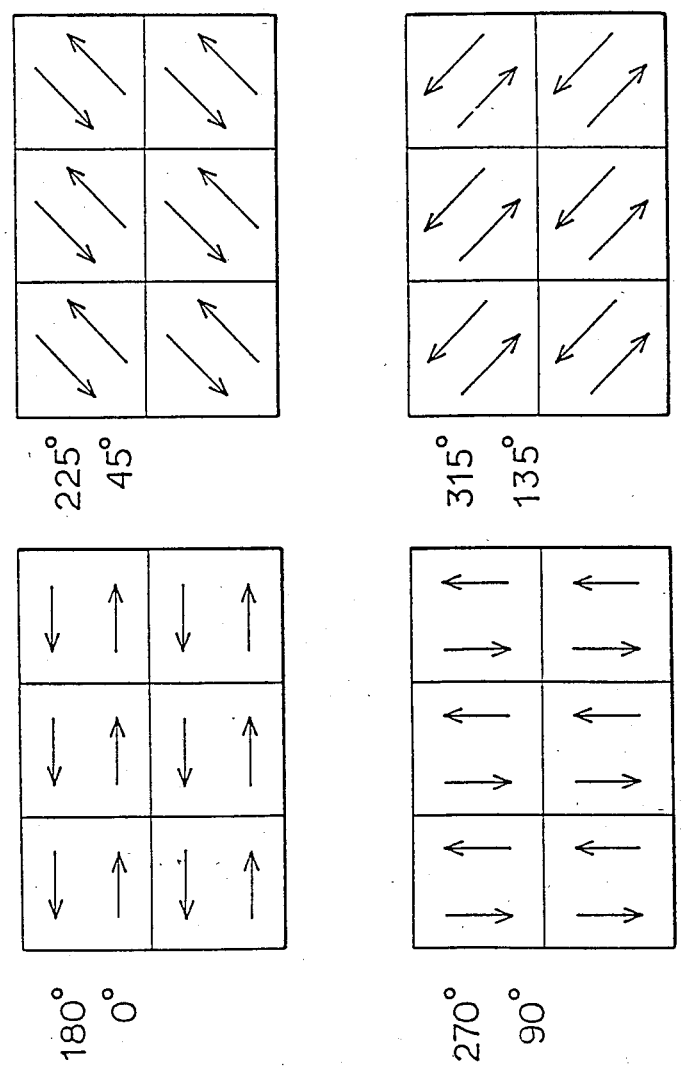
FIG. 1B illustrates the directivity of the simple cells contained in the second cell block of the information consolidator of the pattern recognition system shown in FIG. 1.
Figure 2:
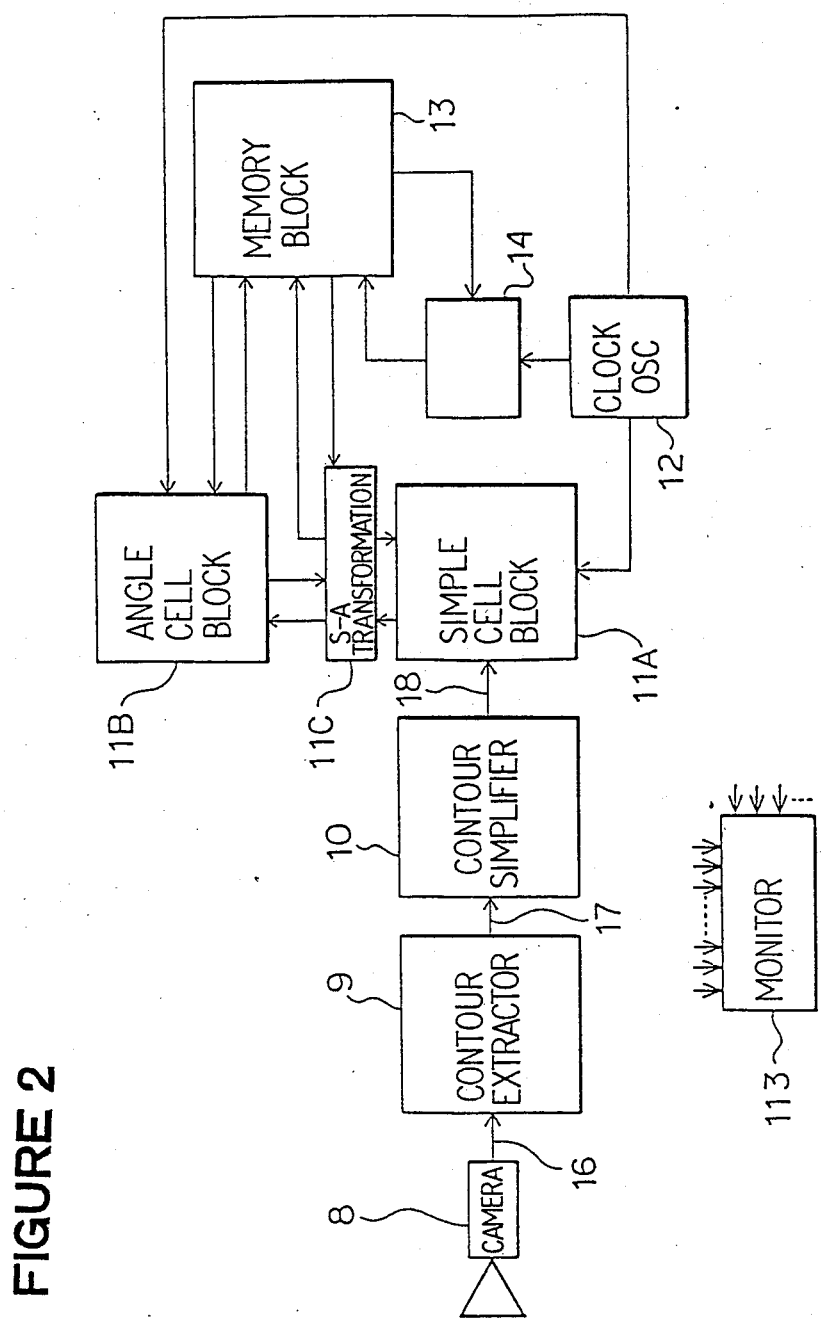
FIG. 2 is a block diagram showing the basic structure of a pattern recognition system in accordance with the present invention.

Referring to FIG. 2, there is shown the basic structure of an embodiment of the pattern recognition system in accordance with the present invention. In the shown system, the pattern preprocessing unit 1 shown in FIG. 1 comprises a camera 8 detecting an object to be recognized, a contour line extracting circuit 9 connected to receive a video signal 16 from the camera 8, and a contour simplifier 10 connected to an output 17 of the contour extractor 9 and adapted to simplify the extracted contour. The output 18 of the contour simplifier 10 is connected to the information consolidator 2 shown in FIG. 1 which comprises a simple cell block 11A functioning as the first cell block 2A, an angle cell block 11B functioning as the second cell block 2B and a S-A transformation block 11C coupling between the simple cell block 11A and the angle cell block 11B. The simple cell block 11A and the angle cell block 11B receive a clock signal 22 from a clock oscillator 12.

The memory 3 is composed of a memory block 13 associated with a memory clock generator 14 This memory clock generator 14 is connected to receive a clock from the clock oscillator 12 and operates to generate a memory clock signal to the memory block 13. Further, there is provided an operation monitor 113 connected to the above mentioned circuits.

The contour extractor 9 receives the video signal 16 from the camera 8 and operates to extract a contour line of the object to be recognized, from a black-and-white distribution on an image plane produced by the video signal 16. A typical method for extracting the contour line is a differentiation of the black-and-white data, which is well-known to persons skilled in the art and therefore explanation will be omitted.

Figure 3:
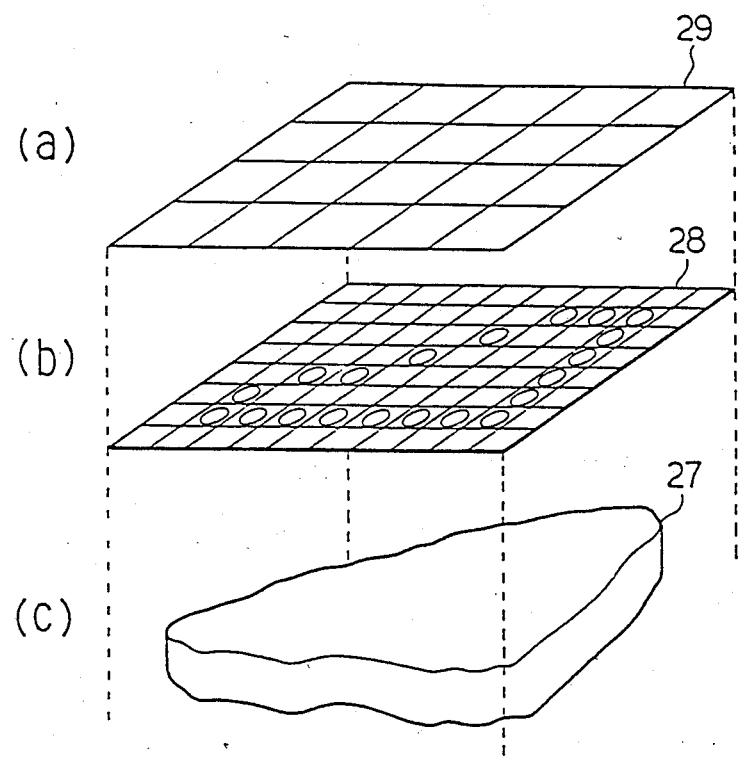
FIG. 3 illustrates the relation among an object to be recognized, a pattern supplied to the pattern preprocessing unit but not yet treated in the pattern preprocessing unit, and a matrix of simple cells in of the first cell block of the information consolidator.

FIG. 3 shows one example of the contour extraction. If an object 27 as shown in FIG. 3 (c) is detected by the camera 8, the contour extractor 9 outputs a contour signal 17 which represents a triangular contour as shown in FIG. 3 (b) on an imaginary plane 28 in which the contour is drawn by small circles.

The contour simplifier 10, which receives the contour signal 17, has a matrix of outputs forming an image plane 29 whose mesh is larger or coarser than that of the imaginary contour plane 28, as shown in FIG. 3 (a). This contour simplifier 10 acts to examine on the basis of the data outputted from the contour extractor 9, whether or not the contour passes through the respective meshes of the image plane 29. Thus, the outputs corresponding to the respective meshes of the plane 29 are supplied as a simplified contour signal 18 to the simple cell block 11A.

This contour simplifier 10 can be easily constructed in a well-known way, and therefore, further explanation on the internal structure of the simplifier 10 will be omitted.

Next, explanation will be made on the simple cell block 11, the angle cell block 11B, the clock oscillator 12 and the memory block 13, which are respectively constituted of nonlinear oscillators common to those circuits. This is one important feature of the present invention, and the common nonlinear oscillator will be called "unitary oscillator" hereinafter.

Figure 4:
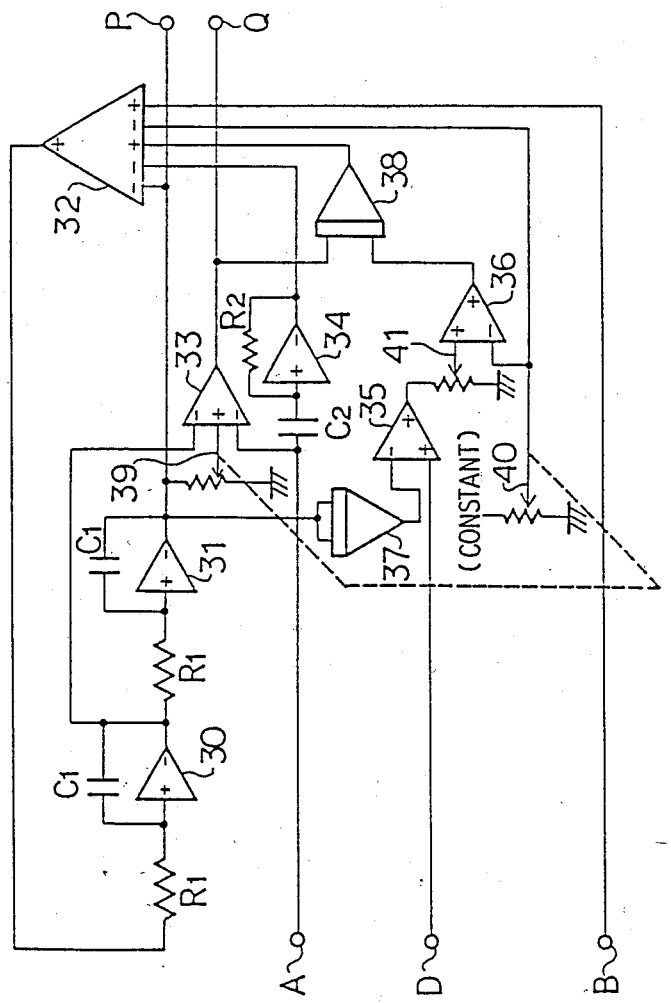
FIG. 4 is a circuit diagram showing the structure of the unitary oscillator.

Referring to FIG. 4, the unitary oscillator includes seven operational amplifiers 30 to 36. In FIG. 4, the signs "+" and "−" given to inputs and outputs represent a non-inverted condition and an inverted condition, respectively. As shown, the amplifiers 30 and 31 have an input connected to a resistor R1 so as to receive an input signal through the resistor, and a capacitor C1 is connected between the input and the output of these amplifiers. Therefore, the amplifiers 30 and 31 forms integrators, respectively. The amplifier 34 is adapted to receive an input signal through a capacitor C2, and a resistor Rs is bridged between the input and the output, so that a differentiator is formed. The other amplifiers 32, 33, 35 and 36 are used as analog adders.

Further, there are provided a pair of multipliers 37 and 38 and three variable resistors 39, 40 and 41. The variable resistors 39 and 40 are interlocked. Three input terminals A, B and D and a pair of output terminals P and Q are provided.

The above mentioned elements 30 to 41 and the input and output terminals A, B, D, P and Q are interconnected as shown in FIG. 4, so that the amplifiers 30, 31 and 32 form a feedback loop circuit generating a basic oscillation, and the other elements constitute a Van der Pole type nonlinear oscillator.

With the above arrangement, if a positive voltage is applied to the input D, the amplitude of oscillation is magnified, and if a negative voltage is applied to the input D, the oscillation is weakened. The inputs A and B are interference inputs to the oscillation of the unitary oscillator itself, and therefore, are connected to other unitary oscillators. If such interference signals are not applied to the inputs A and B, the outputs P and Q have a phase difference of 90°. Then, if the interference input signals are applied, the difference in phase between the outputs P and Q is increased or decreased, and the frequency and amplitude of the signal from each of the outputs P and Q are also varied.

Figure 5:
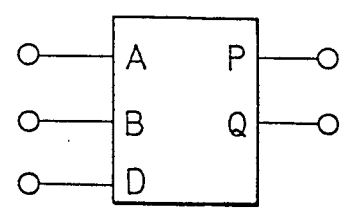
FIG. 5 shows a block indicative of the unitary oscillator.

The above mentioned unitary oscillator will be represented by a block shown in FIG. 5 in the succeeding drawings. In addition, it is constructed such that if the unit oscillators used in the simple cell block 11A are oscillated at an angular frequency "W", the unit oscillators used on the angle cell block 11B and the memory block 13 are oscillated at an angular frequency "W/2".

Figure 6:
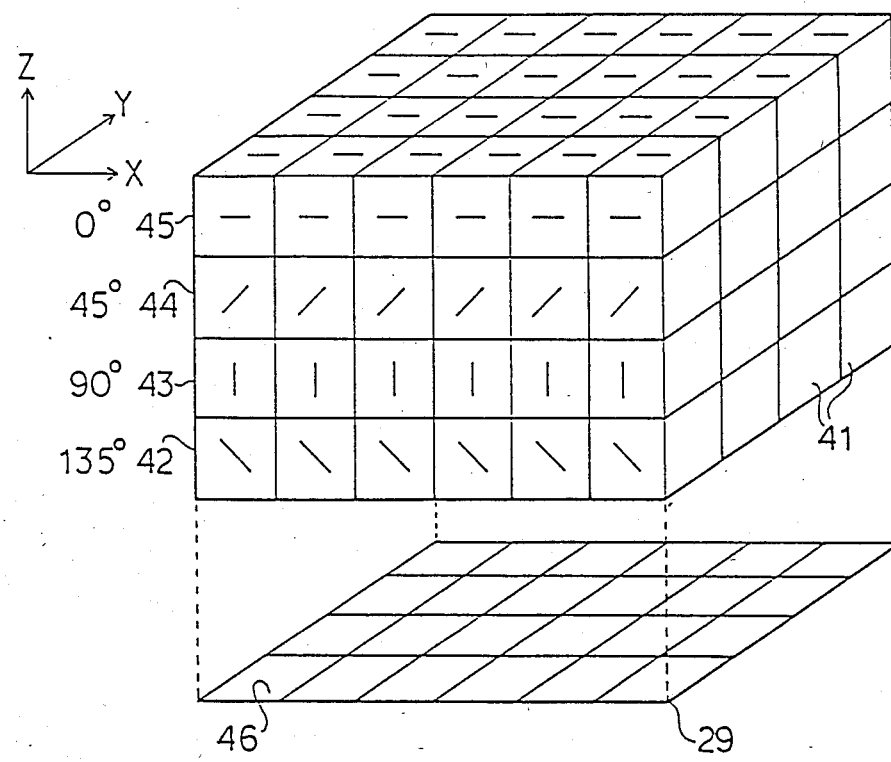
FIG. 6 illustrates the correspondence between the simple cell block and the inclination distribution plane.

Turning to FIG. 6, there is shown a corresponding relation between the contour image plane 29 produced by the contour simplifier 10 and the simple cell block 11A. The simple cell block 11A is constituted of a plurality of simple cells 41 which are arranged in three-dimension and each of which is formed by the aforementioned unitary oscillator If the contour image plane 29 has a mesh structure of 6×4, and if the directivity of the inclination is divided four stages, for example, 0°, 45°, 90° and 135°, the numbers of the simple cells in X-, Y- and Z- directions are 6, 4 and 4, respectively. Namely the simple cell block 11 is formed of 96 simple cells, and four simple cells, 42 to 45 in Z-direction correspond to the mesh 46 of the contour plane 29. Thus, four layers of simple cell groups are located in the simple cell block 11.

Figure 7:
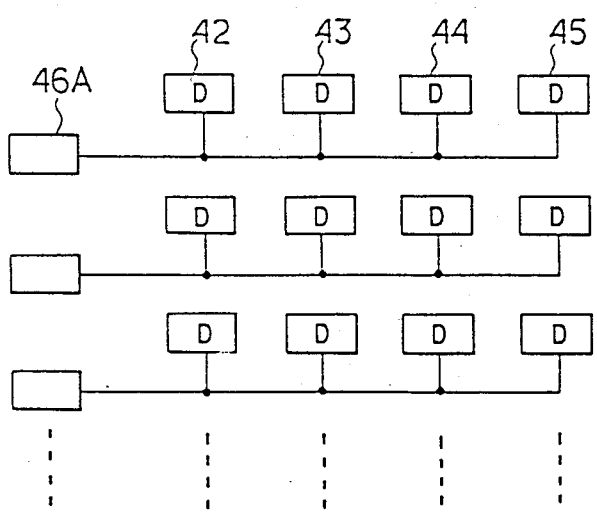
FIG. 7 illustrates the connection relation of the unitary oscillators in the respective hypercolumn of the simple cell block.

This location of four layers of simple cell groups is achieved by connecting the D inputs of each four unit oscillators 42 to 45 to one output 46A of the contour simplifier 10 which corresponds to one mesh 46 of the image plane 29, as shown in FIG. 7. The contour simplifier 10 operates to output a positive voltage signal to the D inputs of the four unitary oscillators positioned in one column of the simple cell block when the contour line passes through the corresponding mesh of the plane 29. Also, the contour simplifier 10 supplies a negative voltage signal to the D inputs of the four unitary oscillators positioned in one column when no contour line passes through the corresponding mesh of the plane 29.

A column of simple cells in Z-direction such as the column of the simple cells 42 to 45 will be called "hypercolumn" hereinafter, and a layer of simple cells extending in X-Y plane will be called "hyperplane" hereinafter.

Each simple cell receives interference inputs from other simple cells in the same hypercolumn, and interference inputs from other simple cells in the same hyperplane. Each simple cell also receives the outputs from the clock oscillator 12 and the memory block 13. As a result, each simple cell changes its oscillation condition under influence of these inputs.

Figure 8:
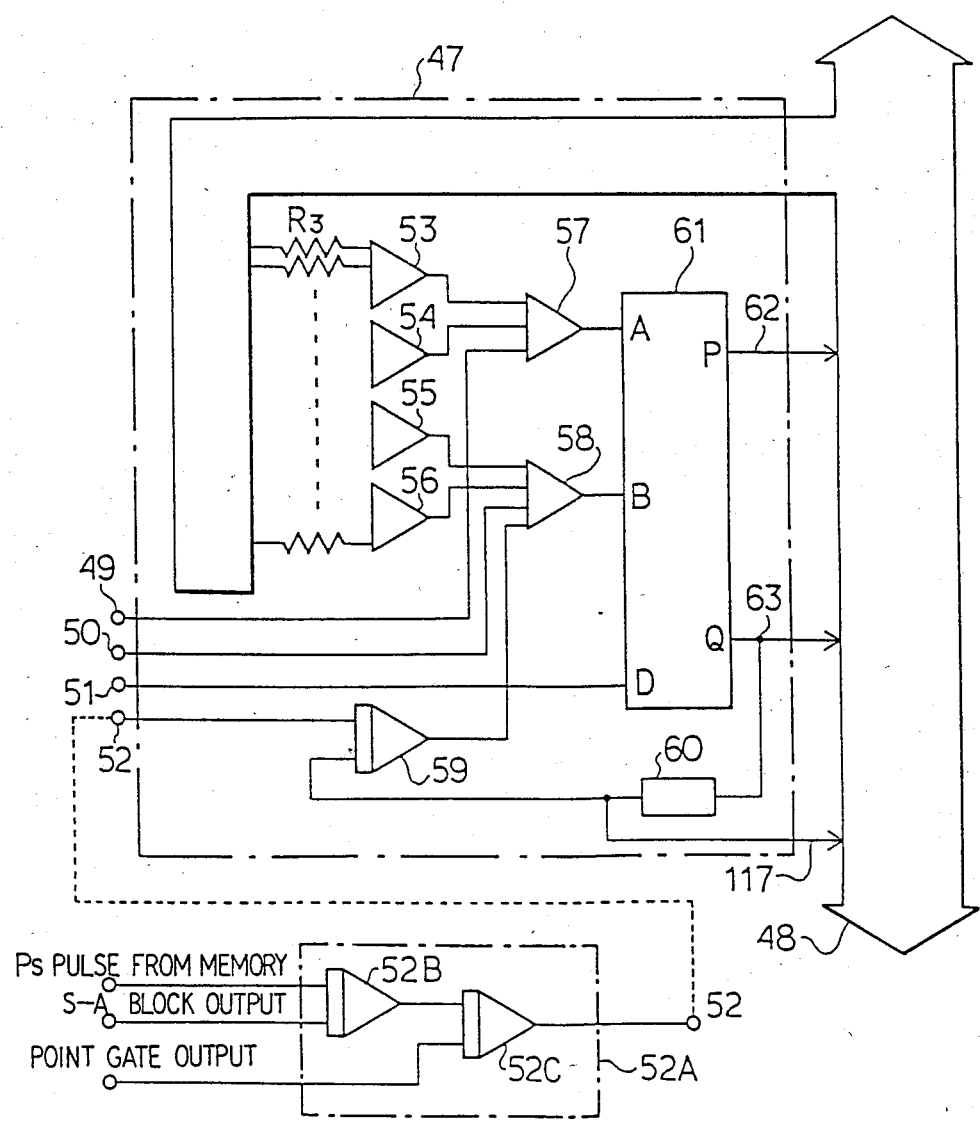
FIG. 8 is a circuit diagram of the simple cell.

Referring to FIG. 8, here is shown an internal structure of the simple cell, which is generally shown by Reference Numeral 47. Each simple cell 47 is coupled to an internal bus 48 provided in the simple cell block. The output signals of all the simple cells pass through the internal bus 48. Further, the simple cell 47 has first and second inputs 49 and 50 receiving a pair of cell clock signals derived from the output of the clock oscillator. The simple cell 47 also includes a third input 51 connected to the corresponding output of the contour simplifier 10. Accordingly the third input 51 corresponds to the D input shown in FIG. 7. A fourth input 52 of the simple cell receives a feedback signal from of the memory block 13 via an input converting circuit 52A. This input converting circuit 52A includes a multiplier 52B receiving a Ps pulse from the memory and an output of the SA transformation block 11C, and another multiplier 52C receiving an output of the first multiplier 52B and an output 105 of a point gate which will be explained hereinafter.

The simple cell includes six analog adders 53 to 58, a multiplier 59, a pulse generator 60 and a unitary oscillator 61 which are interconnected and also connected to the inputs 49 to 52 and the internal bus 48 as shown in FIG. 8.

The unitary oscillator 61 has the P and Q outputs coupled through lines 62 and 63 to the internal bus 48. The adders 53, and 55 receive the P and Q outputs of the other simple cells in the same hypercolumn through gain adjusting resistors R3. On the other hand, the adders 54 and 56 also receive through gain adjusting resistors R3 the P and Q outputs of adjacent other simple cells in the same hyperplane.

Specifically, the connection between the simple cells in the same hypercolumn is such that the amplitudes of the P and Q outputs of each simple cell are weakened by the P and Q outputs of the other simple cells. The reason for this is that the simple cells in the same hypercolumn correspond to segments of different directions and therefore it is necessary to weaken the output each other so that one dominant direction is clarified.

Figure 9:
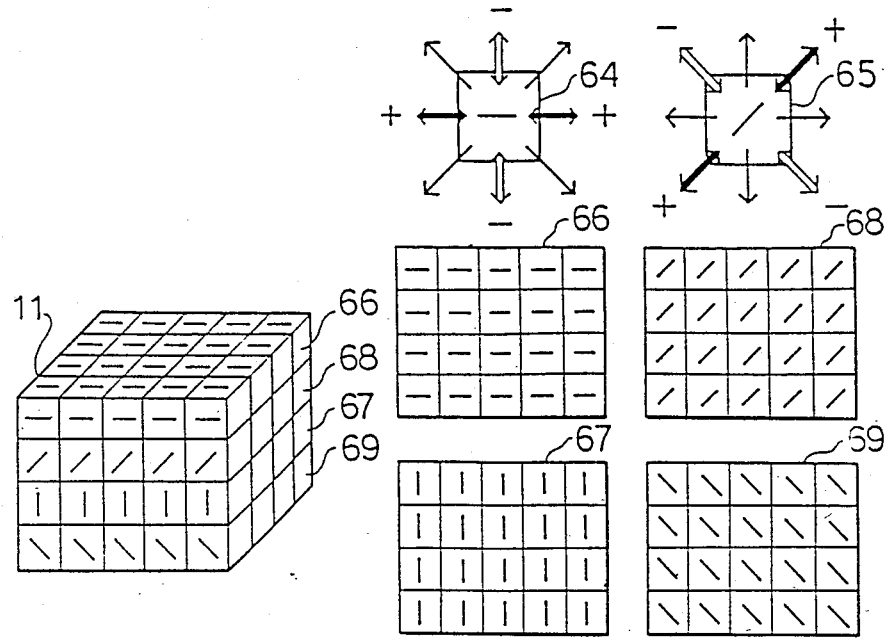
FIG. 9 illustrates the directivity of each simple cell in the simple cell block and also shows the connection relation between the adjacent simple cells in the same hyperplanes.

Referring to FIG. 9, Reference Numerals 64 and 65 show the directivity of two different typical simple cells. Also, FIG. 9 illustrates the top view of the four hyperplanes 66 to 69 with the inclined segment in each simple cell showing the inclination of the contour line to which the simple cells is reactive. As seen from FIG. 9, all the simple cells in the same hyperplane have the same direction of inclination. This relation of inclination is realized by selecting the polarity of the signal inputted to the address 54 and 56.

Specifically, the simple cells 64 and 65 are connected through the bus 48 to adjacent simple cells in the directions shown by bold black arrows in such a polarity as to emphasize the oscillation each other. Further, the simple cells 64 and 65 are connected through the bus 48 to adjacent simple cells in the directions shown by bold white arrows in such a polarity as to weaken or deemphasize the oscillation each other. Therefore, the simple cells 64 and 65 correspond to those constituting the hyperplanes 66 and 68, respectively. Thus, with the emphasizing and the deemphasizing of the simple cell outputs in the directions of the arrows, there are decided the reacting or activated simple cells having the same directivity as that of the contour in the corresponding cell positions. Incidentally, no interference is given in the direction of thin arrows in the simple cells 64 and 65.

As mentioned hereinbefore, the simplified contour given by the contour simplifier 10 is drawn on the mesh plane, and therefore, if the contour has a segment inclined in one direction and continuing over several meshes, the simple cells corresponding to the above segment and in alignment in the above direction are emphasized in oscillation each other, and the cells positioned perpendicular to the above segment are weakened in oscillation. Accordingly, a struggle for existence is performed among the simple cells in the respective hyperplanes, and finally, the most dominant simple cell row remains in the respective hyperplanes for each inclined segment of the contour. On the other hand, the oscillation of the other cells is suppressed.

The above struggle-for-existence operation is given by the adders 53 to 56 in each simple cell 47, as interaction in the simple cell block 11A. The other elements of the simple cell block 11A, i.e., the inputs 50 and 51, the multiplier 59 and the pulse generator 60 will be explained hereinafter.

Figure 6A:
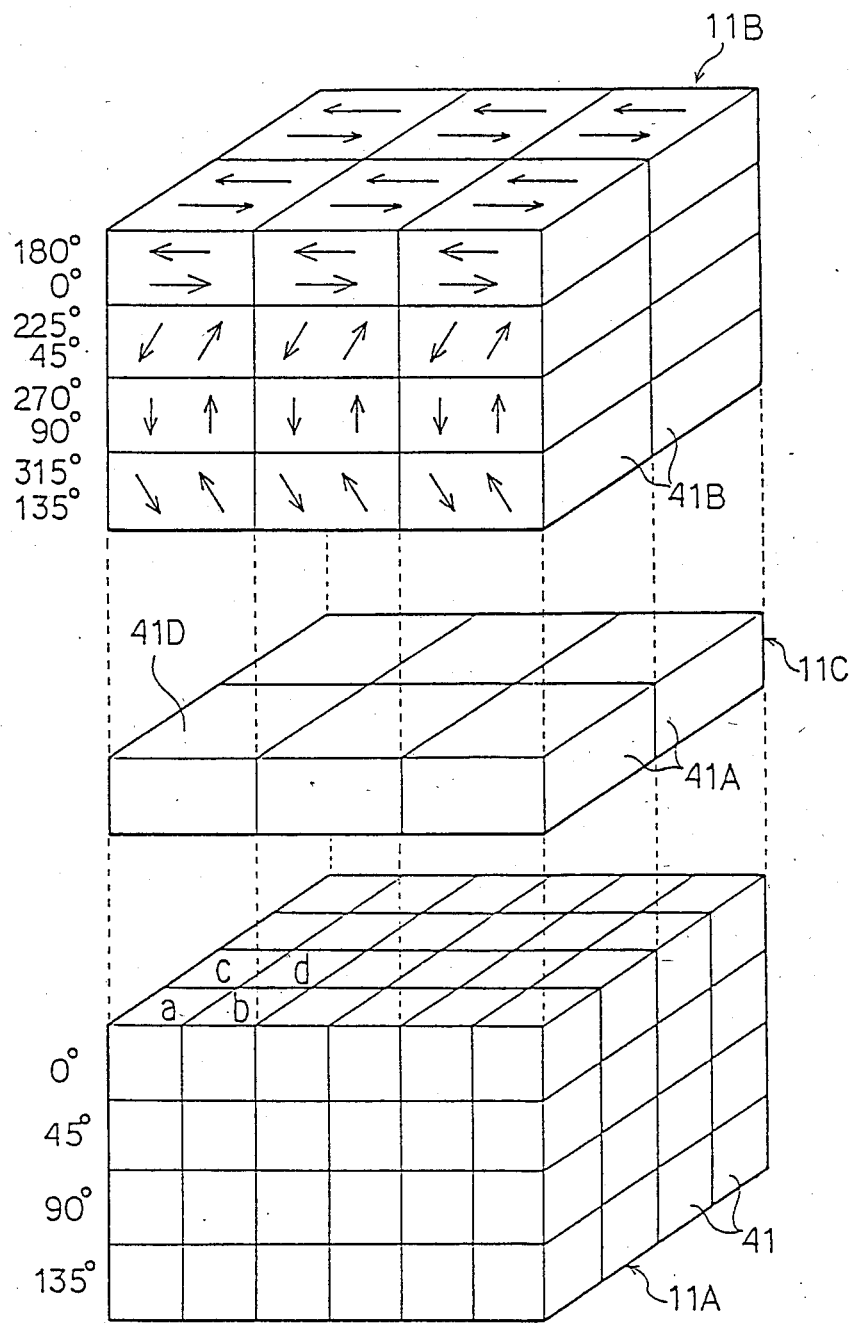
FIG. 6A illustrates the correspondence between the simple cell block, the S-A transformation block and the angle cell block.

Turning to FIG. 6A, there is shown a corresponding relation between the simple cell block 11A, the angle cell block 11B and the S-A transformation block 11C. In the shown example, while the "hyperplane" of the simple cell block 11A is constituted of a plurality of simple cells 41 which are arranged in the form of a mesh structure of 6×4, the S-A transformation block 11C is composed of six cells 41A of 3×2. Each of the six cells in the S-A transformation block 11C is coupled to outputs of all the simple cells 41 contained in corresponding 2×2 "hypercolumns" of the simple cell block 11A. Each of cells 41A will generate one output.

Figure 7A:
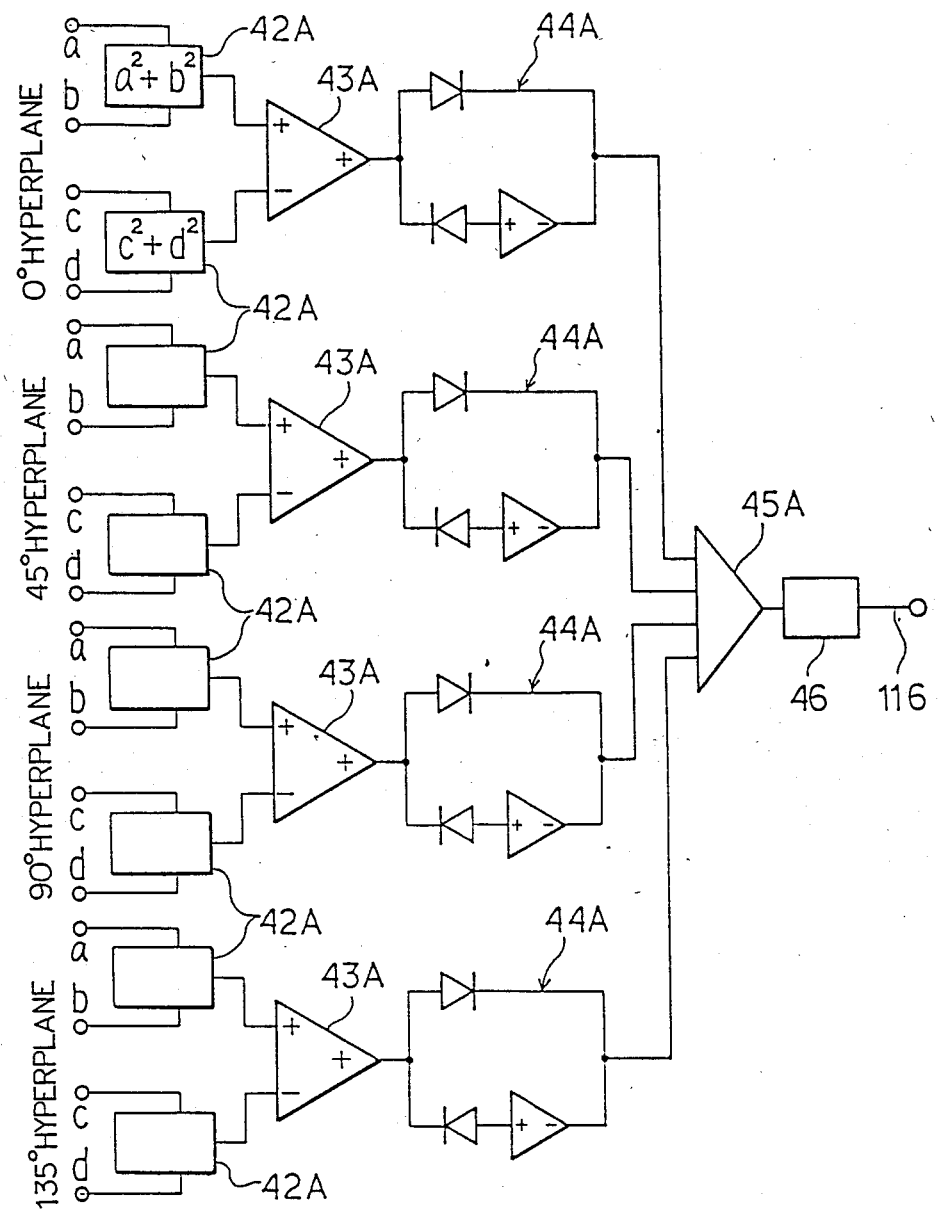
FIG. 7A is a circuit diagram showing one example of a unitary cell in the S-A transformation block.

Turning to FIG. 7A, there is shown one example of a unitary cell used in the S-A transformation block 11C. Explaining the unitary cell 41D shown in FIG. 6A, the unitary cell 41D is connected to receive outputs of all the simple cells 41 contained in the hypercolumns "a", "b", "c" and "d" of the simple cell block 11A. The outputs of the simple cells in each of the hyperplanes belonging to the hypercolumns "a", "b", "c" and "d" are respectively connected to corresponding logic operation circuits 42A, each of which generates an output $(X^2+Y^2)$ in response to a pair of inputs X and Y. Outputs of the logic circuits 42A belonging to the same hyperplane are supplied to a subtractor 43A, whose output is applied through a buffer 44A to an adder 45A. This adder is connected at its output to a function generator 46. In response to the input signals, the function generator 46 operates to generate a binary signal of "1" or "0" to the corresponding cell of the angle cell block 11B.

The angle cell block 11B is composed of four layers, each of which includes a plurality of simple cells 41B arranged in the form of a mesh structure of "2×3". The simple cell 41B will be called an "angle cell" in some cases hereinafter. The angle cells in each of the layers correspond to the "2×3" cells in the S-A transformation block 11C, and are excited by the corresponding cells 41A.

Figure 8A:
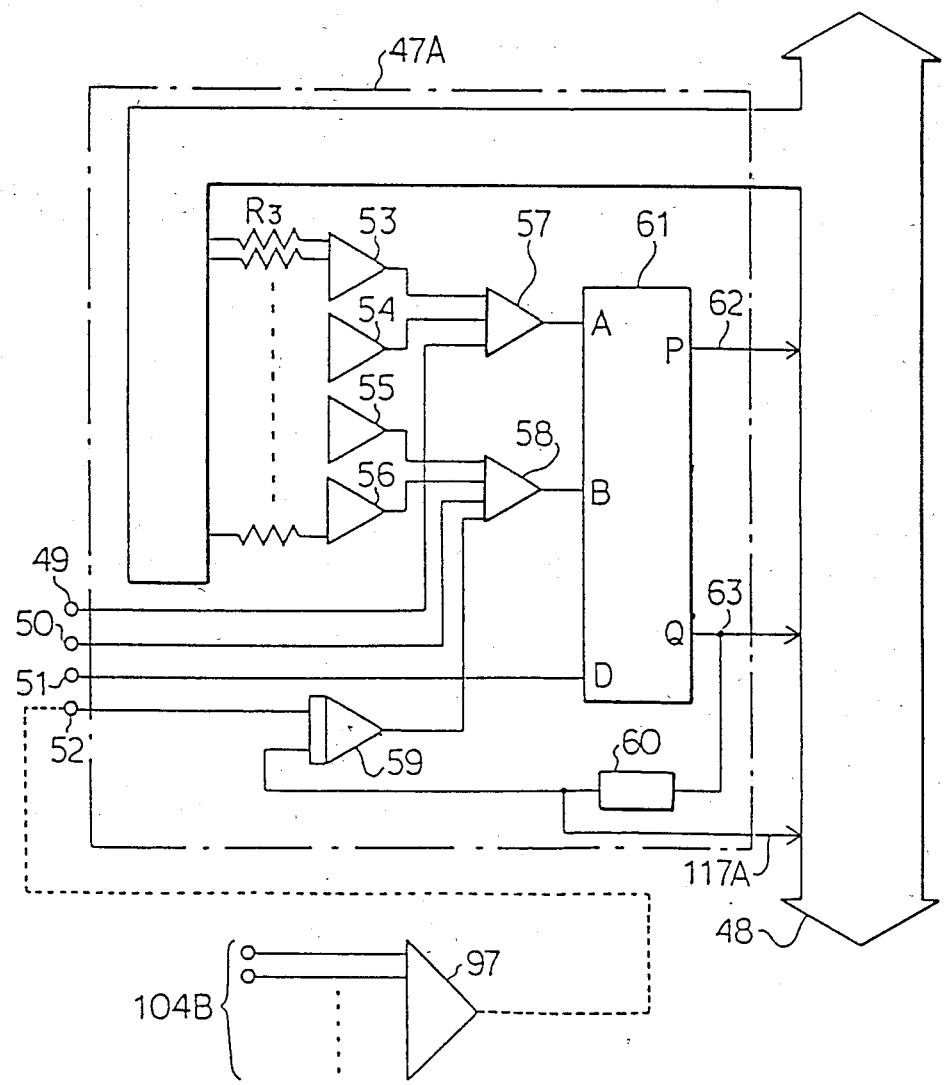
FIG. 8A is a circuit diagram of the angle cell.

Referring to FIG. 8B, there is shown an internal structure of the angle cell, which is generally shown by Reference Numeral 47A. As seen from comparison between FIGS. 8 and 8A, the angle cell has a structure similar to that of the simple cell, and therefore, elements similar to those shown in FIG. 8 are given the same Reference Numerals and explanation thereof will be omitted. The input 52 connected to the one input of the multiplier 59 is connected to an output of an adder 97, not to the input converting circuit 52A. To inputs of the adder 97 there are supplied the outputs 104 of all points contained in the same item of a memory block explained hereinafter.

Each angle cell 47A is coupled to an internal bus 48 provided in the angle cell block. The output signals of all the angle cells pass through the internal bus 48. Further, the angle cell 47A has first and second inputs 49 and 50 receiving a pair of cell clock signals derived from the output of the clock oscillator. The angle cell 47A also includes a third input 51 connected to the output of the corresponding unitary cell of the S-A transformation block 11C.

The angle cell includes six analog adders 53 to 58, a multiplier 59, a pulse generator 60 and a unitary oscillator 61 which are interconnected and also connected to the inputs 49 to 52 and the internal bus 48 as shown in FIG. 8. The unitary oscillator 61 has the P and Q outputs coupled through lines 62 and 63 to the internal bus 48.

The adders 53 and 55 receive the P and Q outputs of the other angle cells in the same hypercolumn through gain adjusting resistors R3. On the other hand, the adders 54 and 56 also receive through gain adjusting resistors R3 the P and Q outputs of adjacent other angle cells in the same hyperplane.

Specifically, the connection between the angle cells in the same hypercolumn is such that the amplitudes of the P and Q outputs of each angle cell are weakened by the P and Q outputs of the other angle cells. The reason for this is that the angle cells in the same hypercolumn correspond to segments of different directions and therefore it is necessary to weaken the output each other so that one dominant direction is clarified.

Figure 9A:
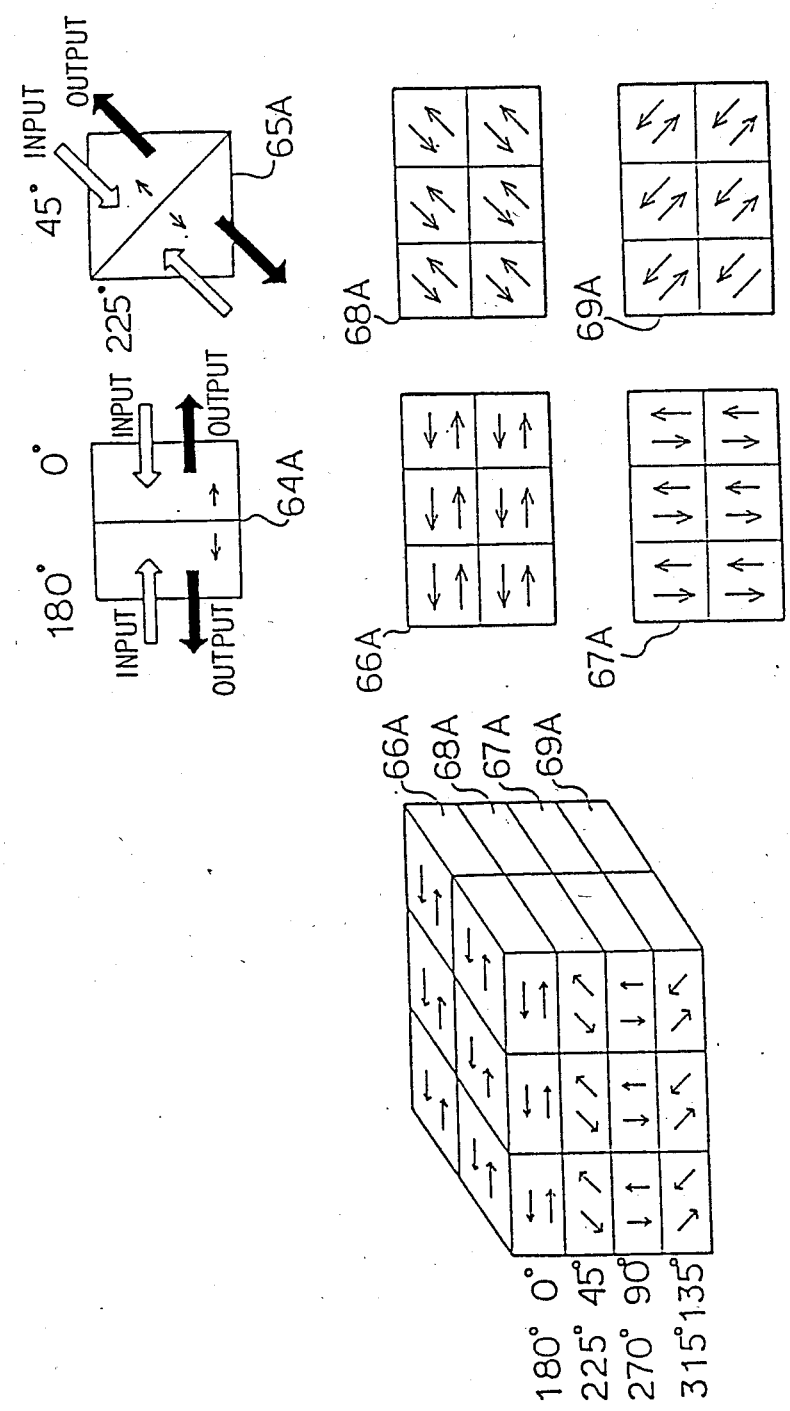
FIG. 9A illustrates the directivity of each simple cell in the angle cell block and also shows the connection relation between the adjacent angle cells in the same hyperplanes.

Referring to FIG. 9A, Reference Numerals 64A and 65A show the directivity of two different typical angle cells. Also, FIG. 9A illustrates the top view of the four hyperplanes 66A to 69A with the inclined arrow in each angle cell showing the orientation of the contour line to which the angle cell is reactive. As seen from FIG. 9, all the angle cells in the same hyperplane have the same direction of inclination, but can be divided into a pair of opposite orientations. This relation of inclination is realized by selecting the polarity of the signal inputted to the address 54 and 56. As mentioned above, the each angle cell is composed of a pair of cells assigned to a pair of opposite orientations. Namely, the angle cell 64A is divided into a first subcell for the orientation of 0° and a second subcell for the orientation of 180°.

Specifically, as seen from FIG. 9A, the angle cells 64A and 65A are connected through the bus 48 to adjacent angle cells in the orientations shown by bold black arrows in such a polarity as to emphasize the oscillation each other. Further, the angle cells 64A and 65A are connected through the bus 48 to adjacent angle cells in the orientations shown by bold white arrows in such a polarity as to weaken or deemphasize the oscillation each other. Therefore, the angle cells 64A and 65A correspond to those constituting the hyperplanes 66A and 68A, respectively. Thus, as mentioned above, all the angle cells in the same hyperplane are coupled such that each angle cell weakens the oscillation of an adjacent angle cell the same orientation as the orientation of the arrow in the same hyperplane.

Next, explanation will be made on the clock oscillator 12 which acts as a reference exciting source for the simple cell block 11A, the single cell block 11B and the memory block 13.

Figure 10:
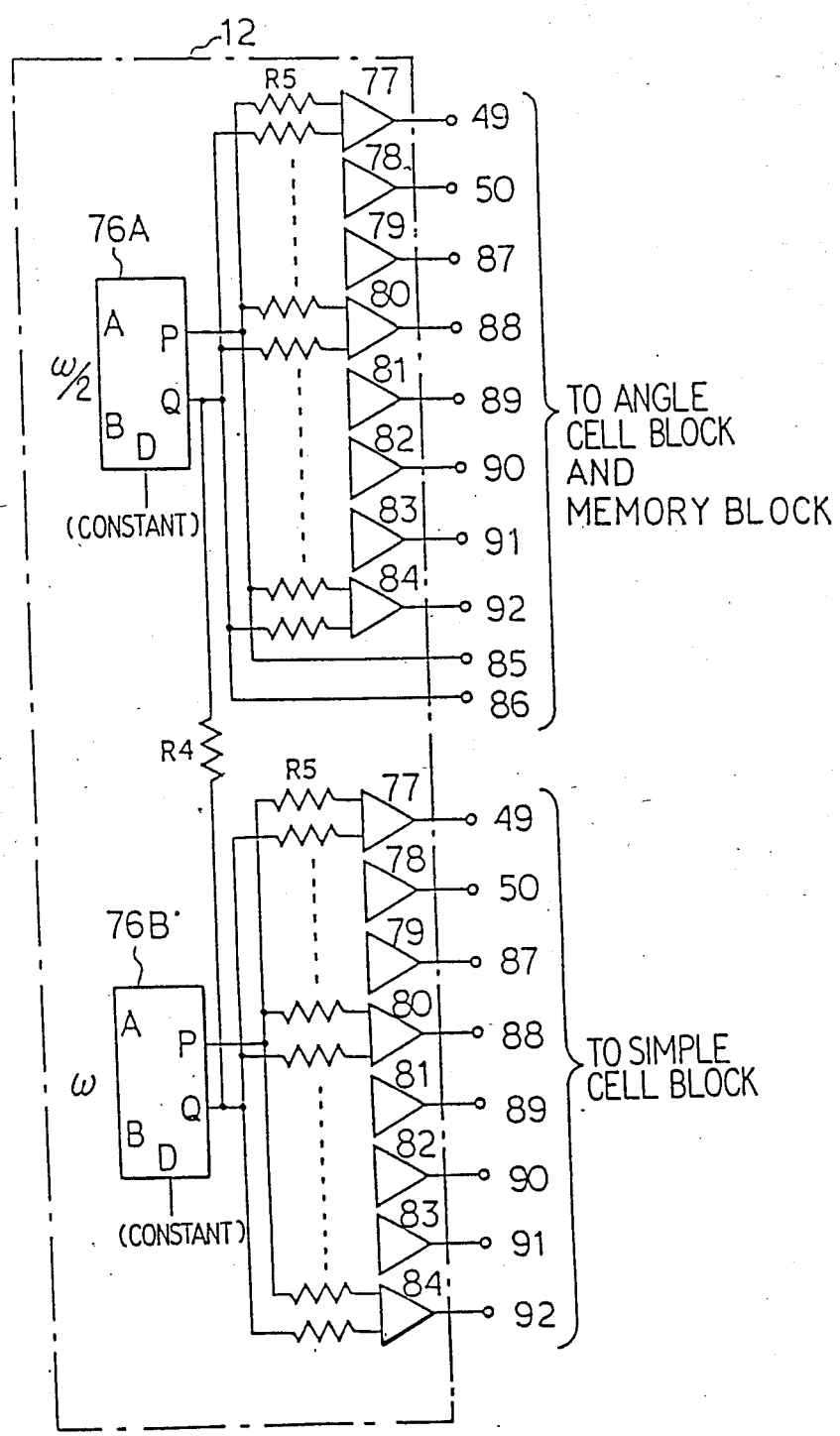
FIG. 10 is a circuit diagram of a clock oscillator.

As shown in FIG. 10, the clock oscillator 12 comprises adders 77 to 84 and one pair of unitary oscillators 76A and 76B interconnected as shown in the drawings. The unitary oscillator 76A oscillates at a frequency of W/2 and the P and Q outputs of the unitary oscillator 76A ar supplied though a pair of output terminals 85 and 86 as a two-phase clock for the memory block 13. On the other hand, the unitary oscillator 76B oscillates at a frequency of W. The respective Q outputs of the unitary oscillators 76A and 76B are coupled through a coupling resistor R4 for phase matching. The P and Q outputs of the unitary oscillators 76A and 76B are coupled through gain adjusting resistors R5 to the adders 77 to 84 whose outputs 49, 50, 87 to 92 give in pair a common two-phase clock for respective hyperplanes. Namely, four pairs of outputs 49 and 50, 87 and 88, 89 and 90, and 91 and 92 are four two-phase clocks for the four hyperplanes, respectively. For example, the pair of outputs 49 sand 50 are the inputs 49 and 50 of all the simple cells 47 (as shown in FIG. 8) in the same hyperplane. Further, the outputs 49, 50, 87 to 92 derived from the unitary oscillator 76A are supplied to the angle cell block and the memory block. On the other hand, the outputs 49, 50, 87 to 92 derived from the unitary oscillator 76A are supplied to the simple cell block.

Referring to FIG. 10A, there is shown simulated oscillation of the simple cell block 11A and the angle cell block 11B caused by the clock oscillator 12. Namely, a pulse having a phase consistent with the direction or orientation assigned to each cell is applied to that cell. Analog waveforms shown in FIG. 10A are analog signals inputted to the respective cells and are coincident with the direction or orientation of the respective cells.

If the clock supplied from the clock oscillator 12 is consistent in phase with the input analog signal to some cell of the simple cell block 11A or the angle cell block 11B, the cell receiving the clock and input analog signal consistent in phase with each other will enlarge the amplitude of its oscillation, with the result that the phase of the oscillation is fixed or locked.

Figure 10B:
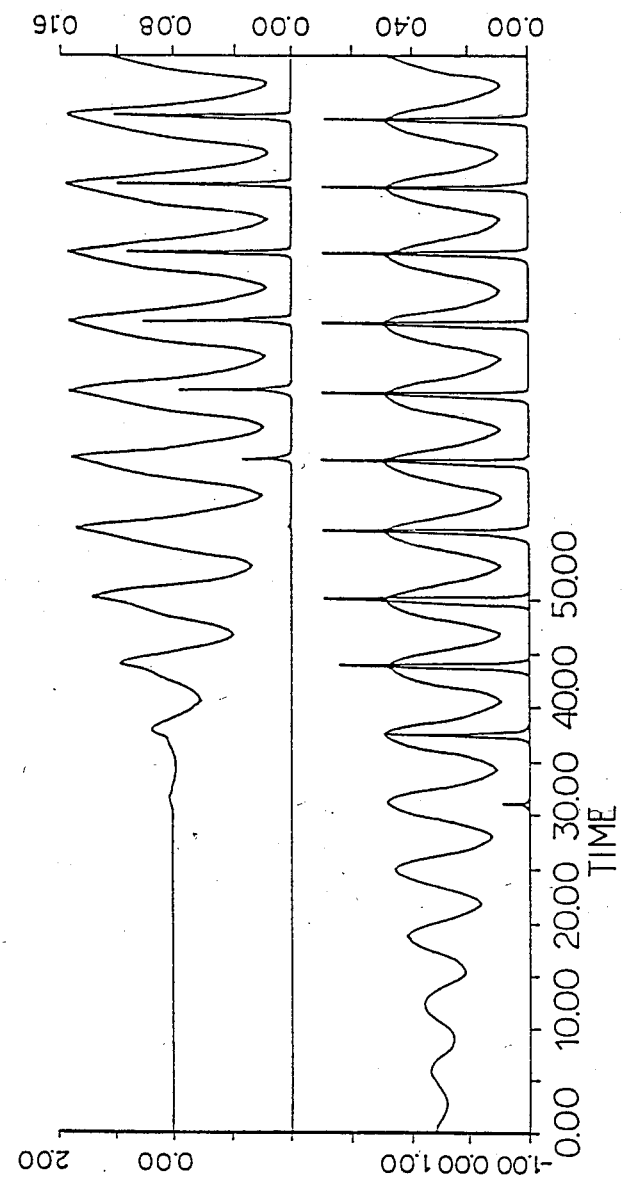
FIG. 10B diagrammatically shows one example of the input analog signal and the clock whose phase are consistent with each other.

Turning to FIG. 10B, there is diagrammatically shown a typical example of the consistent phase relation between the input analog signal and the clock. In FIG. 10B, an upper half shows an output of the cell and a lower half shows an input of the cell, and an impulse-like waveform shows the clock and the an alternating waveform shows the analog signal. Further, the left-hand ordinate indicates the voltage of the analog signal and the righthand ordinate shows the voltage of the clock. Namely, the oscillation of the cell having the clock and input analog signal consistent in phase with each other will ultimately remain so as to form an oscillation pattern consistent with the input pattern.

Now, explanation will be made on the memory block 13, which includes a group of unitary oscillators. In brief, an oscillation having a waveform corresponding to one graphic pattern is generated by a plurality of unitary oscillators, which is called "unitary memory". All the unitary memories in the memory block is energized by signals 85 and 86 consolidating the conditions of the simple cell block 11A and the angle cell block 11B, and at the same time, competition is caused among the unitary memories so that there is finally maintained only the oscillation of the unitary memory most matched to the oscillations of the simple cell block and the angle cell block. In the course of this competition, the oscillation is fed back to the simple cell block 11A and the angle cell block 11B so that the competition is performed in combination of the memory block 13, the simple cell block 11A and the angle cell block 11B. The feedback from the memory block to the simple cell block corresponds to the feedback signal 7 in FIG. 1.

Figure 11:
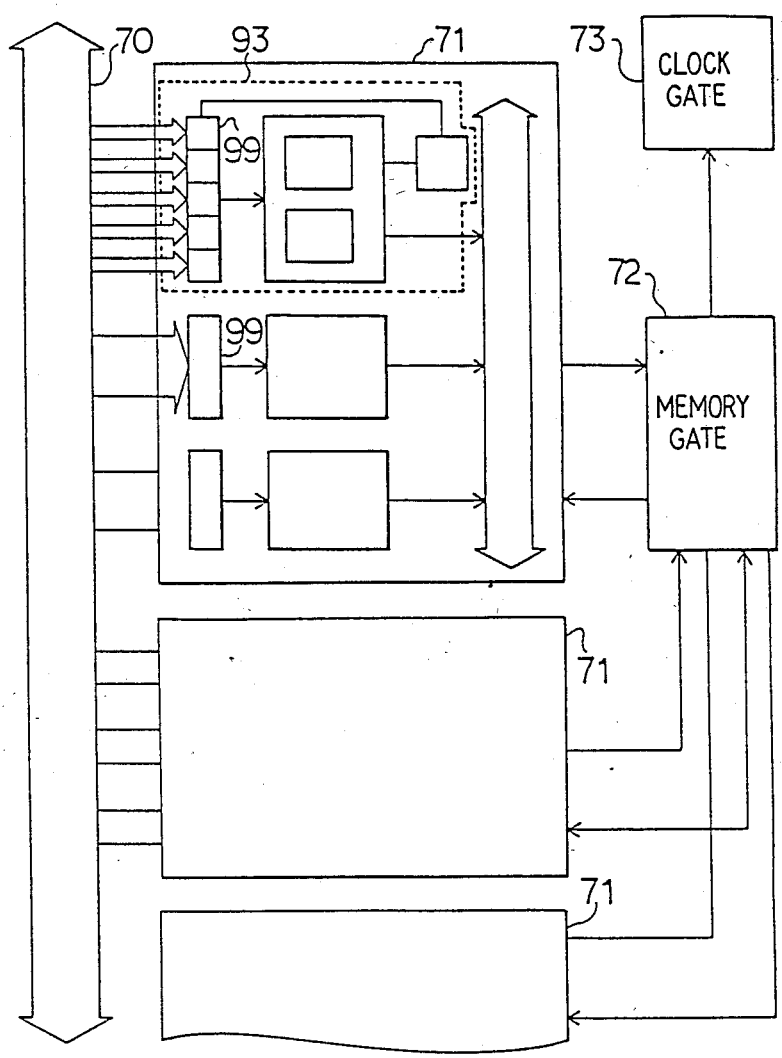
FIG. 11 is a circuit diagram of a memory block.

Referring to FIGS. 11, there is shown the overall structure of the memory block 13. As shown in FIG. 11, the memory block 13 comprises a plurality of item memories 71 coupled through a data bus 70 to the simple cell block 11A and the angle cell block 11B. All the item memories 71 are coupled to a memory gate 72 which is coupled to a clock gate 73 corresponding to the memory clock generator 14. Each of the item memories 71 comprises a plurality of point memories 93.

Figure 12:
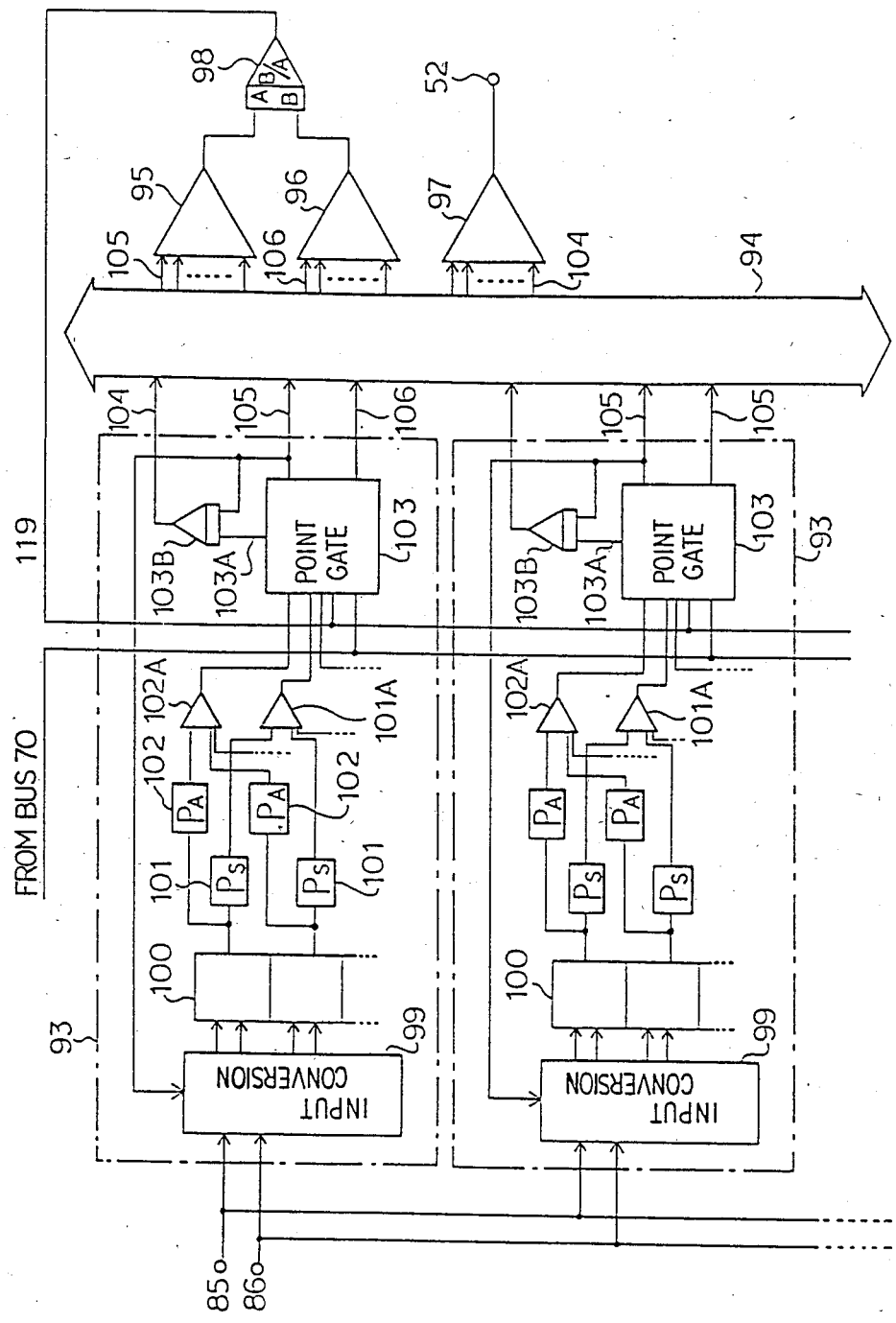
FIG. 12 is a circuit diagram of a point memory.

As shown in FIG. 12, each of the point memories 93 has outputs coupled through an item memory internal bus 94 to adders 95 and 97. Two of these adders 95 and 96 are connected at their outputs to a divider 98.

Further, each of the point memories 93 comprises an input conversion circuit 99 receiving from the clock oscillator 12 a pair of clock pulses 85 and 86 consolidating the conditions of the simple cell block 11A and the angle cell block 11B. To the input conversion circuit 99 there is inputted an output 105 which is one of outputs of the point memory 93 itself. The input conversion circuit 99 has a plurality of outputs each one pair of which are coupled to a memory oscillator 100. An output of each memory oscillator 100 is connected to a pair of pulse generators 101 and 102. One of these pulse generators 101 generates a simple cell pulse $P_S$, and the other generator 102 generates a simple cell pulse $P_A$. All outputs of the pulse generators 101 located in the same point memory are inputted to an adder 101A, and all outputs of the pulse generators 102 located in the same point memory are inputted to an adder 102A.

Outputs of the adders 101A and 102A are supplied to a point gate 103, which also receives, as explained hereinafter, the outputs of all the simple cells of the simple cell block, the unitary cell of the S-A transformation block, and the angle cells of the angle cell block, which are positioned at the same mesh, i.e., on the same coordinate position in the hyperplane. The point gate 103 also receives a feedback signal.

The point gate 103 has a pair of outputs 105 and 106 which are coupled via the item memory internal bus 94 to the adders 95 and 96, respectively. In other words, the adder 95 is connected to receive tho outputs 105 of all the point memories 93 contained in the same item memory 71, and the adder 96 is connected to receive the outputs 106 of all the point memories 93 contained in the same item memory 71. The outputs of these adders 95 and 96 are inputted to the divider 98, which generates a signal 119 indicative of an averaged gate width of the point gates in the same item memory as mentioned hereinafter. This signal 119 is fed back to the respective point gates 103 in the same item memory.

Further, the point gate 103 has a third output 103A, which is supplied together with the output 105 to a multiplier 103B. An output of this multiplier 103B is inputted to the adder 97 as an output 104 of the point memory. In other words, the adder 97 is connected to receive the outputs 104 of all the point memories 93 in the same item memory 71, and generates a signal indicative of the degree of coincidence between the pulse in the item memory concerned and the pulse of the S-A transformation block. This signal is supplied to the terminal 52.

Figure 13:
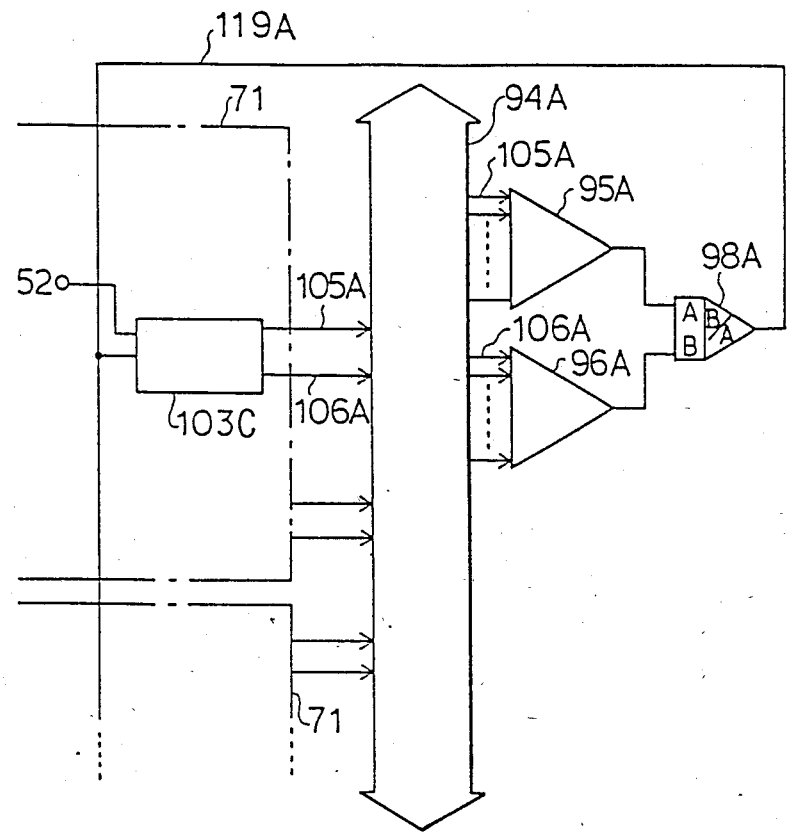
FIG. 13 is a circuit diagram of a circuit receiving the output of the item memory.

This terminal 52 is supplied to a memory gate 103C as shown in FIG. 13, which memory gate 103C is provided for each of the item memories 71. The memory gate 103C has a pair of outputs 105A and 106A which are coupled via the memory block internal bus 94A to a par of adders 95A and 96A, respectively. In other words, the adder 95A is connected to receive the output 105A of the memory gate 103C contained in the each item memory 71 and the adder 96A is connected to receive the output 106A of the memory gate 103C contained in the each item memory 71. The outputs of these adders 95A and 96A are inputted to a divider 98A, which generates an averaged gate width signal 119A, which is in turn fed back to another input of the memory gate 103A in the each item memory.

Figure 14:
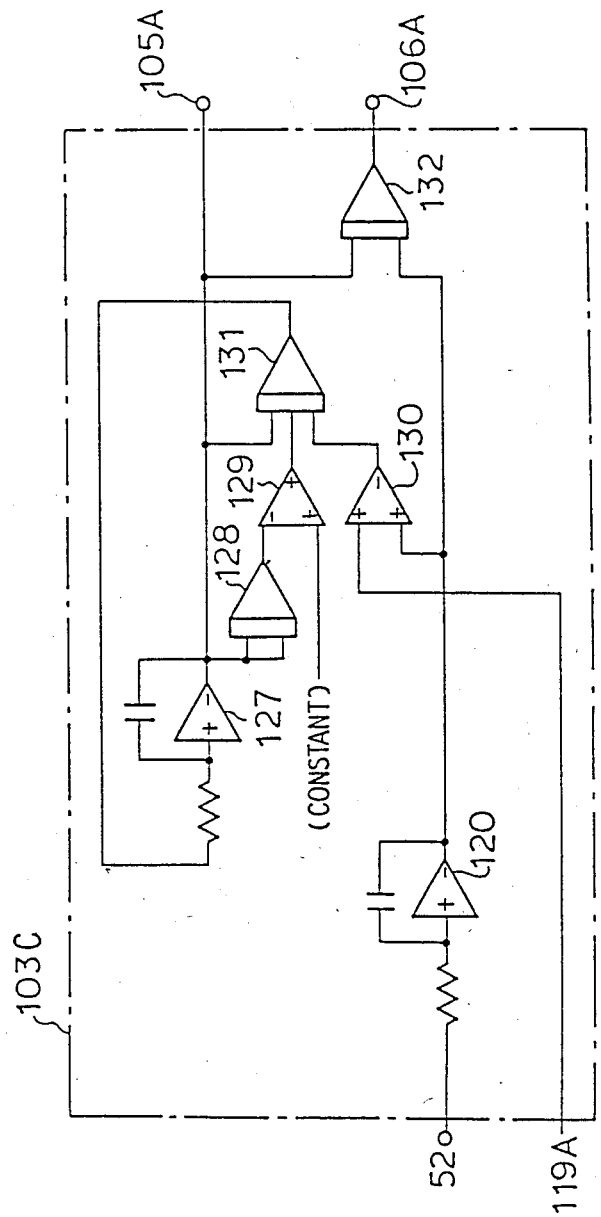
FIG. 14 is a circuit diagram of a memory gate.

Reference to FIG. 14, the memory gate 103C comprises an integrator 120 receiving the output signal 52. An output of the integrator 120 is connected to one input of an adder 130, which is also connected to receive at its other input the averaged gate width signal 119A from the divider 98A. An output of the adder 130 is connected to one input of a multiplier 131, whose output is connected to an input of an integrator 127. An output of the integrator 127 gives the gate width output 105A. Further, the output of the integrator 127 is connected directly to a second input of the multiplier 131 and a pair of inputs of another multiplier 128. A squared signal outputted from the multiplier 128 is connected to one input of a subtractor 129, which receives a constant value at another input. An output of the subtractor 129 is connected to a third input of the multiplier 131. In addition, the outputs of the integrators 120 and 127 are coupled to a multiplier 132, whose output gives the output 106A.

Thus, the competition circuit has been constituted. If the input is greater than the averaged gate width 119A, the memory gate width 105A is acceleratedly increased. On the contrary, if the input is less than the averaged gate width 119A, the memory gate width 105A is acceleratedly decreased. Such a memory gate 103C is provided in all the item memories so as to form the memory gate 72.

Figure 15:
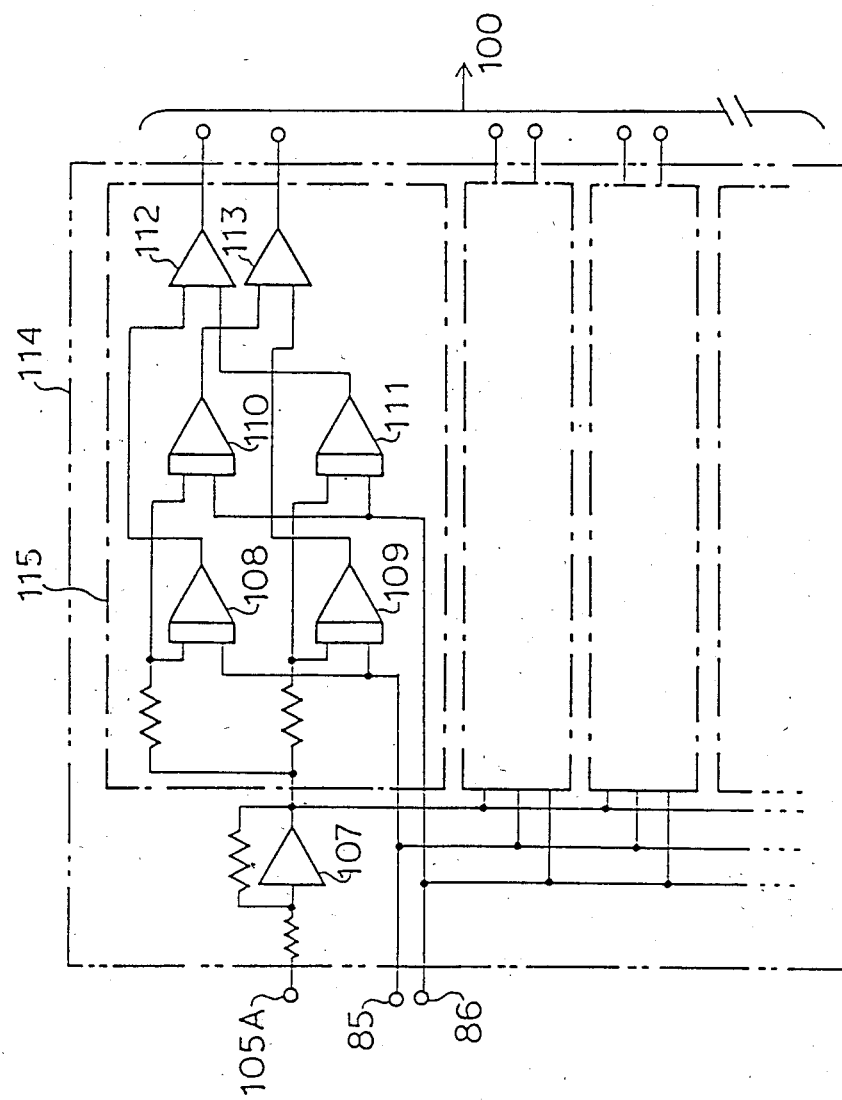
FIG. 15 is a circuit diagram of an input converting circuit of a clock gate.

Further, the memory gate width output 105A for each item memory is inputted to an input conversion circuit 114 of the clock gate 73 as shown in FIG. 15. The shown input conversion circuit 114 includes a gain setting circuit 107 receiving the memory gate width output 105A. An output of the gain setting circuit 107 is each of conversion circuits for respective memory oscillators 100. In other words, in each of the item memories, there are provided the conversion circuits of the number corresponding to the number of the memory oscillators 100. In addition, memory clocks 85 and 86 from the clock oscillator 12 are inputted to each of the conversion circuits 115.

Each of the conversion circuits 115 includes four multipliers 108 to 111 and two adders 112 and 113 interconnected as shown in the drawing. In this arrangement, a proportional operation is performed by the multipliers 108 to 111, so that the input memory clocks 85 and 86 are converted into a two-phase clock in proportion to the gate width output 105A. The converted two-phase clocks are supplied to the memory oscillator 100.

Figure 16:
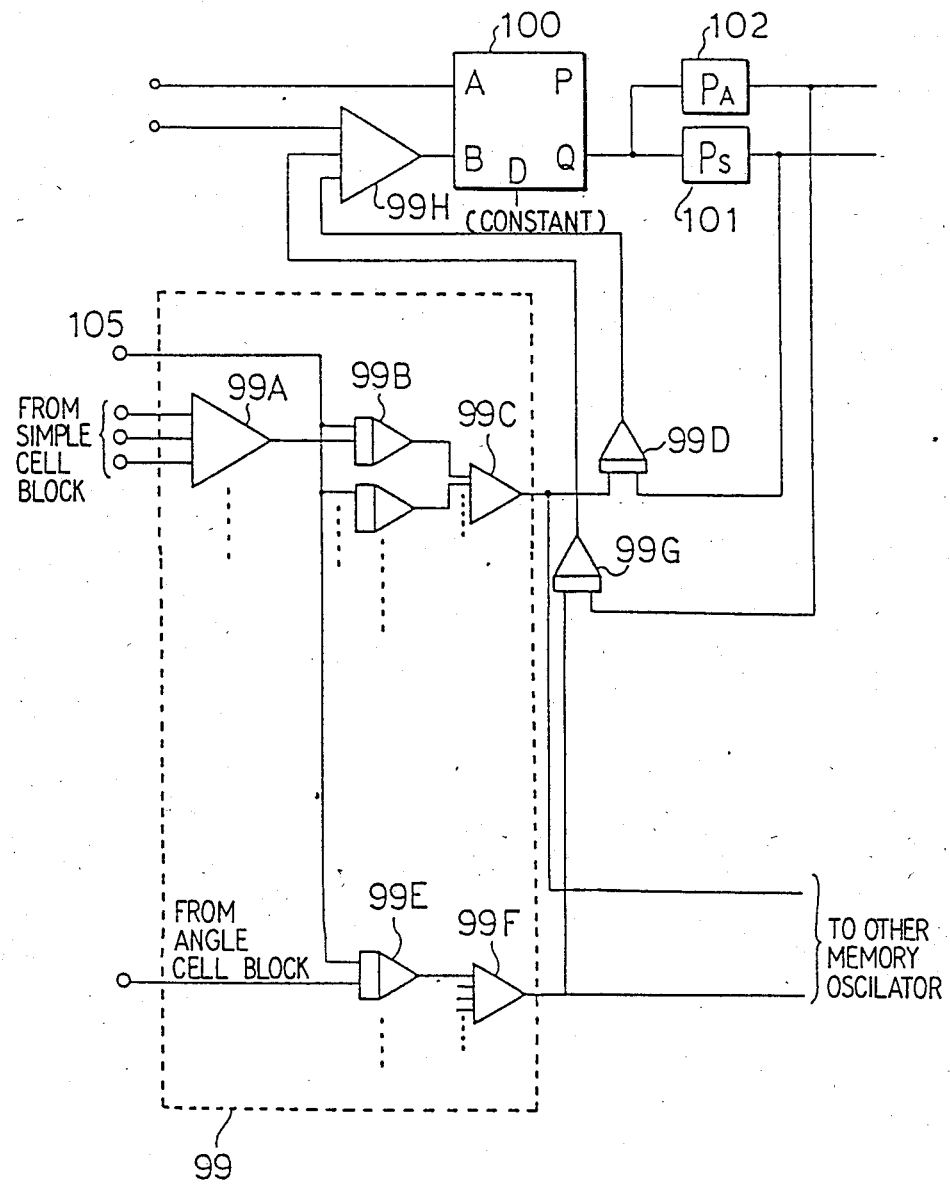
FIG. 16 is a circuit diagram showing the circuit structure of the input converting circuit.

Referring to FIG. 16, there is shown a logic circuit diagram of the input conversion circuit 99 used in the point memory shown in FIG. 12. As shown in FIG. 16, the input conversion circuit 99 receives the output 105 from the point gate 105, and also through the bus 70 the outputs of the simple cell block and the outputs of the angle cell block.

The outputs of the simple cell block are grouped for each of the respective coordinate areas (p, q), and each group of outputs are inputted to one adder 99A. An output of each adder 99A is connected to one input of a multiplier 99B whose other input is connected to receive the output 105 of the point gate. Outputs of all the multipliers 99B are supplied to another adder 99C, whose output is connected to one input of another multiplier 99D. This multiplier 99D receives at its other input the output of the simple cell pulse $P_A$ generator 101.

On the other hand, the outputs of the angle cell block are respectively supplied to one input of a multiplier 99E provided for each of the respective coordinate areas (p, q). The other input of each multiplier 99E is connected to receive the output 105 of the point gate. Outputs of all the multipliers 99E are supplied to another adder 99F, whose output is connected to one input of another multiplier 99G. This multiplier 99G receives at its other input the output of the angle cell pulse $P_A$ generator 102.

Respective outputs of the multipliers 99D and 99G are inputted to an adder 99H. This adder 99H receives at its other input one of the pair of the clocks 85 and 86. The other clock of the paired clocks is directly inputted to the A input of the memory oscillator 100. An output of the adder 99H is connected to the B input of the memory oscillator 100.

Figure 17:
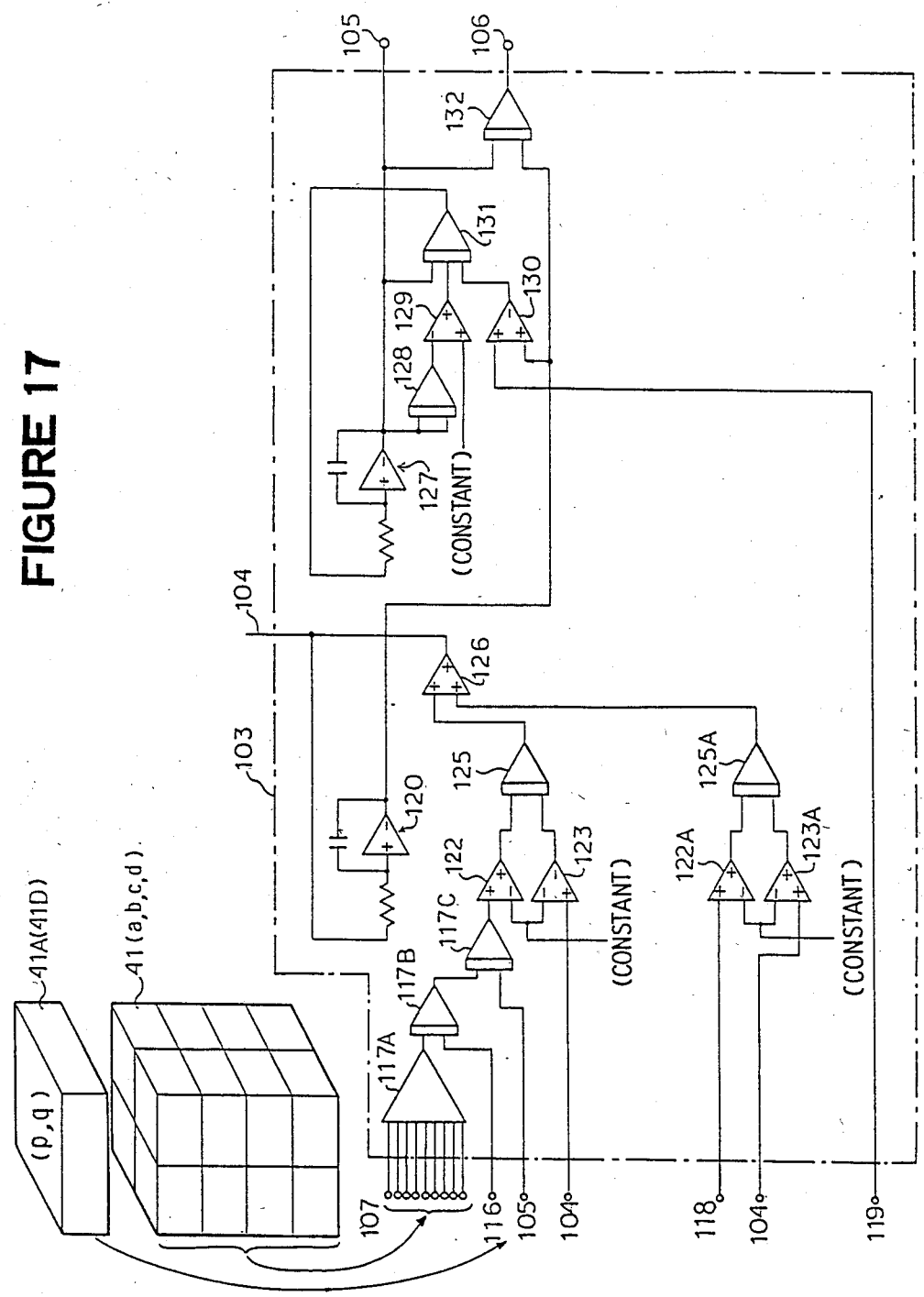
FIG. 17 is a circuit diagram showing the circuit structure of the point gate provided in the point memory.

Turning to FIG. 17, there is shown a logic circuit diagram of the point gate 103 provided in the point memory shown in FIG. 12. In FIG. 17, elements similar to those of the memory gate 103A shown in FIG. 14 are given the same Reference Numerals.

The point gate 103 includes an adder receiving the outputs of all the simple cells 41 contained in four hypercolumns (for example, "a", "b", "c" and "d") corresponding to one unitary cell 41A (for example 41D) of the S-A transformation block 11C located at a coordinate position (p. q) assigned to each point memory. An output of the adder 117A is connected to one input of a multiplier 117B, whose other input is connected to receive the output of one corresponding unitary cell 41A (for example 41D) of the S-A transformation block 11C. An output of the multiplier 117B is coupled to one input of another multiplier 117C. To the other input of this multiplier 117C, the output 105 of the point gate 103 itself is fed back. An output of the multiplier 117C is connected to one input of a subtractor 122, which receives a constant voltage at its other input. A deference output generated by the subtractor 122 is applied to one input of a multiplier 125, whose other input is connected to an output of another subtractor 123. This subtractor has a first input receiving a constant voltage and a second input receiving the output 104 of the point gate 103 itself in a feed back manner. An output of the multiplier 125 is connected to one input of an adder 126.

An output 118 is connected to one input of a subtractor 122A, which receives a constant voltage at its other input. A deference output generated by the subtractor 122A is applied to one input of a multiplier 125A, whose other input is connected to an output of another subtractor 123A. This subtractor has a first input receiving a constant voltage and a second input receiving the output 104 of the point gate 103 itself in a feed back manner. An output of the multiplier 125A is connected to the other input of an adder 126.

An output of the adder 126 is outputted as the output 104 of the point gate 103 and also is inputted to an integrator 120, which output is connected to one input of adder 130. This adder receives at its other input the averaged gate width output 119 from the divider 98 shown in FIG. 12. An output of the adder 130 is connected to one input of a multiplier 131, whose output is connected to an input of an integrator 127. An output of the integrator 127 gives the gate width output 105. Further, the output of the integrator 127 is connected directly to a second input of the multiplier 131 and a pair of inputs of another multiplier 128. A squared signal outputted from the multiplier 128 is connected to one input of a subtractor 129, which receives a constant value at its other input. An output of the subtractor 129 is connected to a third input of the multiplier 131. In addition, the outputs of the integrators 120 and 127 are coupled to a multiplier 132, whose output gives the output 106A.

Thus, the competition circuit has been constituted. If the output 104 of the adder 126 is greater than the averaged gate width 119, the point gate width 105 is acceleratedly increased. On the contrary, if it is less than the averaged gate width 119, the point gate width 105 is acceleratedly decreased.

Figure 18:
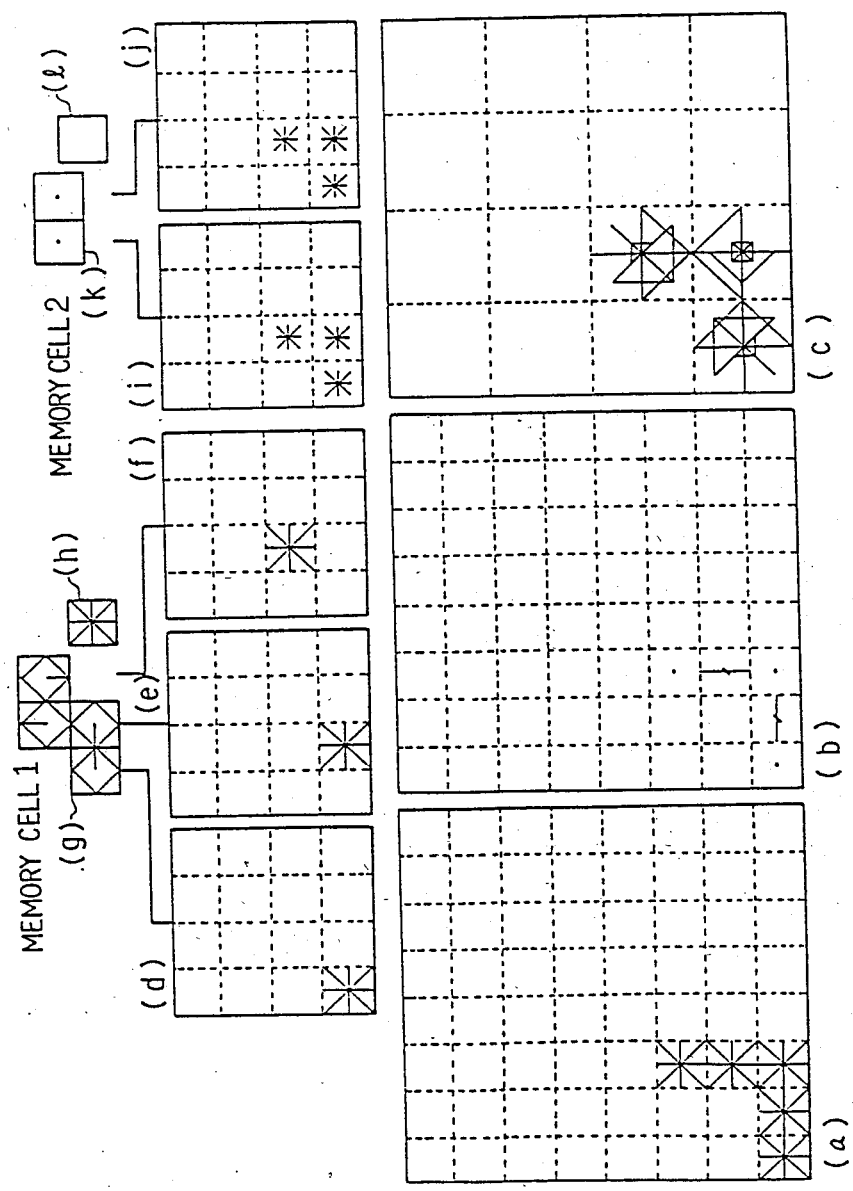
FIG. 18 is an example of exciting pattern illustrating an operation of the pattern recognition system in accordance with the present invention.

Next, explanation will be made on the conditions of various parts observed by the monitor 113, when the pattern recognition system is in operation. FIG. 18 shows one example of a pattern recognition in the case that each hyperplane of the simple cell block is composed of 8×8 simple cells, and each hyperplane of the angle cell block is composed of 4×4 simple cells. Further, the processing is executed not to mutually influence in inclined directions of all directions formed by imaginarily connecting all exciting angle cells to one another. Namely, the angle cells do not mutually influence in all orientations formed by imaginarily connecting all exciting angle cells to one another.

Assume that an L-shaped pattern as shown in FIG. 18(a) is inputted. In this case, the simple cells are excited in a L-shaped pattern as shown in FIG. 18(b). In FIG. 18(b), the four hyperplanes are shown in a superposed manner so that each of meshes shown in FIG. 18(b) indicate the conditions of four simple cells belonging to the same hypercolumn. Namely, the length and the direction of each line segment indicate the magnitude and the direction of the excitations.

If the exciting pattern of the simple cell block is applied to the angle cell block, the respective angle cells are excited as shown in FIG. 18(C). In FIG. 18(c), the four hyperplanes are shown in a superposed manner, similarly to FIG. 18(b), so that each of meshes shown in FIG. 18(c) indicate the conditions of four angle cells belonging to the same hypercolumn. In the case of FIG. 18(c), the right-angled isosceles triangles depicted in each mesh indicate the magnitude and the direction of the excitations. Namely, the right-angled corner and the ares of the triangles indicate the direction and the magnitude of the excitations, respectively.

The exciting patterns of the simple cell block and the angle cell block are applied to the memory. In the memory, the memory point gates of the item memories coincident with the applied pattern are excited at a portion corresponding to the exciting angle cell as shown in FIGS. 18(d), 18(e) and 18(f). As a result, the exciting signal is fed through the memory point gate to the memory cell itself, so that this time, the associated clock gate is opened as shown in FIG. 18(h) so that a necessary exciting clock is supplied.

On the other hand, in the item memories not coincident with the applied pattern, the memory point gate are somewhat opened at portions corresponding to the exciting angle cells as shown in FIGS. 18(i) and 18(j). However, the associated clock gate is closed as shown in FIG. 18(l) so that a necessary exciting clock is not supplied. Therefore, the memory cell 2 is not excited as shown in FIG. 18(k).

Thus, only a pattern retained in the memory coincident with the input pattern will remain as the result of competition, and therefore one recognition is given.

Figure 19:
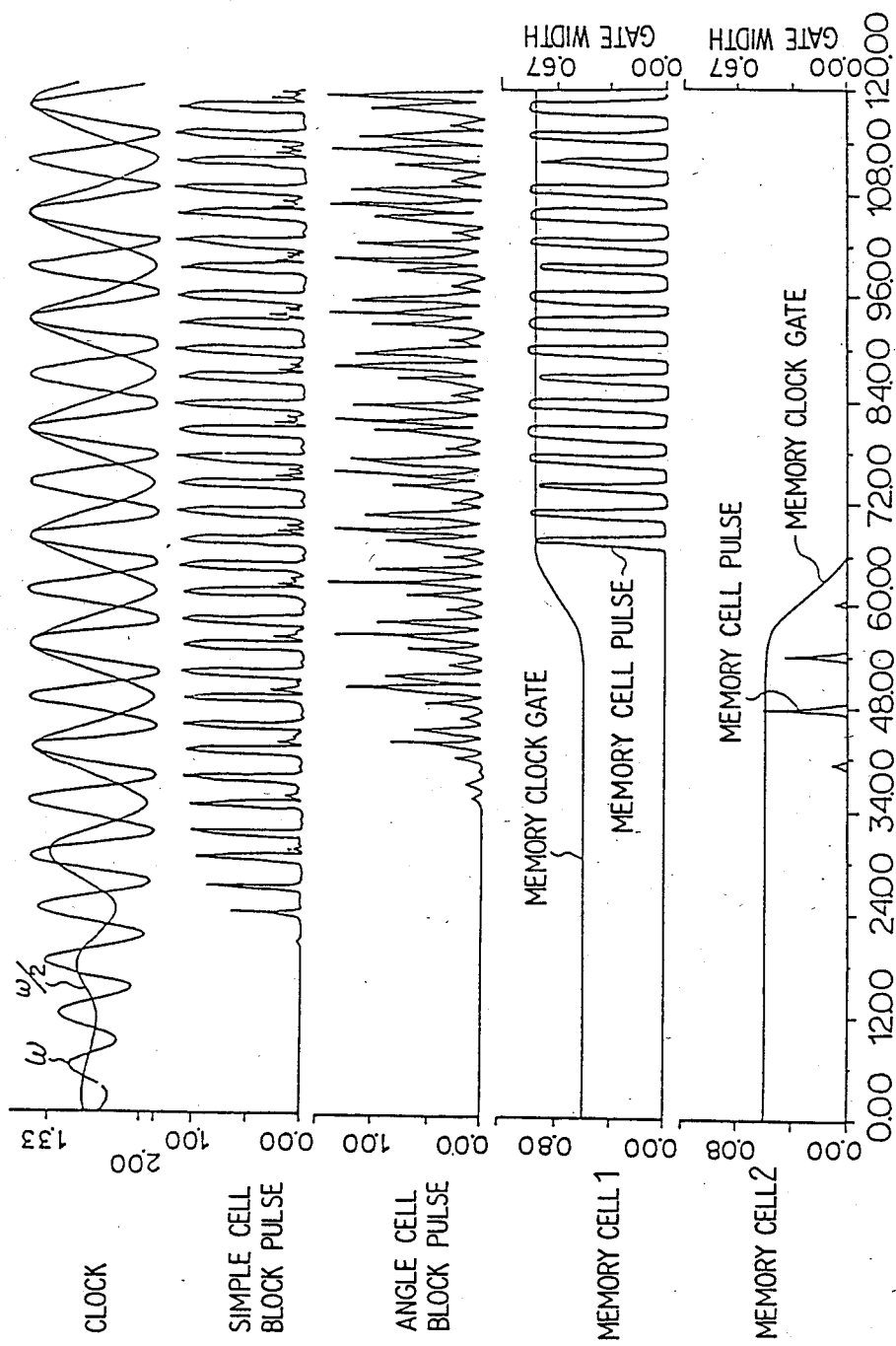
FIG. 19 is a waveform diagram showing signals at various points in the pattern recognition operation shown in FIG. 18.

Referring to FIG. 19, there are shown various waveforms at different points in the course of the above mentioned pattern recognition, in which the axis of abscissas is the time axis starting from the detection of the graphic pattern, and the axis of ordinates indicates the amplitude of various signals.

As seen from FIG. 19, the two clocks W and W/2 increase their amplitude with the time elapsing from the start. The simple cell block pulse is excited with a small delay from the increase of the amplitude in the clocks, and the angle cell block pulse is excited with a further delay from the increase of the amplitude in the simple cell block pulse. In the depicted waveform of the angle cell block pulse, three succeedingly appearing pulses having large amplitudes can be found, which correspond to the three exciting angle cells.

In the memory cell 1, the memory clock gate is gradually opened with time, so that the memory pulse appears. In the memory cell 2, on the other hand, the memory clock gate is gradually closed with time, so that the memory pulse finally disappears.

Figure 20:
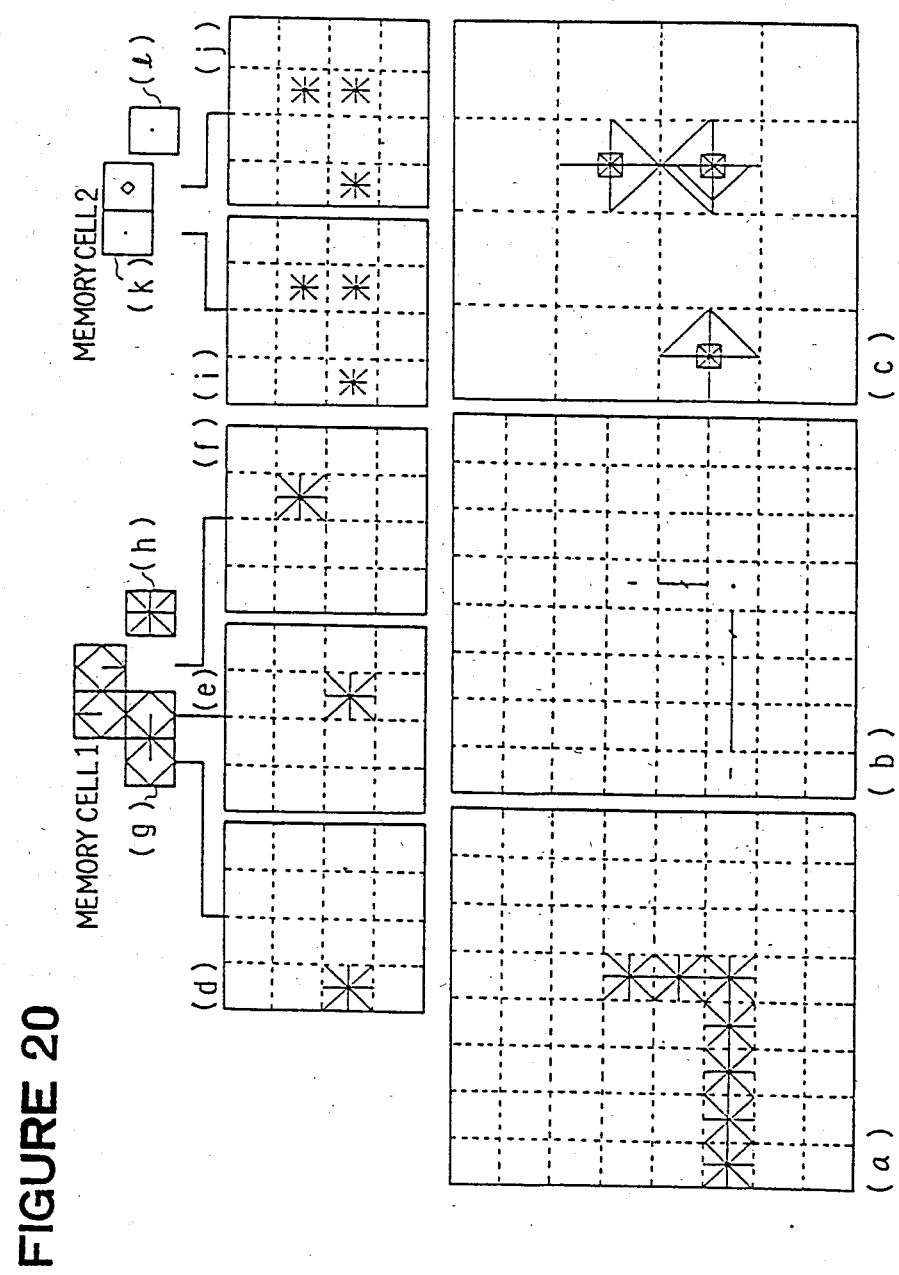
FIG. 20 is another example of exciting pattern illustrating an operation of the pattern recognition system in accordance with the present invention.

Referring to FIG. 20, there is shown another example shown in the same manner as that shown in FIG. 18, in the case of the pattern recognition of an L-shaped pattern similar but not perfectly identical to the L-shaped pattern shown in FIG. 18. There are excited the simple cells, the angle cells, the memory point gates, and the like which are somewhat different from the exciting ones in the case shown in FIG. 18. However, the same memory cell is excited. This means that similar patterns are recognized as being similar ones. This effect is obtained from the fact that a processing is not executed in inclined directions of the line segments of the pattern to be recognized.

Next, explanation will be made on a second embodiment of the pattern recognition system in accordance with the present invention, capable of discriminating a graphic pattern composed of a closed line, such as a triangle and a rectangle. This embodiment is featured by the fact that a plurality of nonlinear oscillators or simple cells used in the memory are divided into a plurality of pairs, and each pair of nonlinear oscillators or simple cells are interconnected so that one simple cell of each simple cell pair receives at its input an output of the other simple cell. Further, the simple cells in each unitary memory are connected in a connection pattern corresponding to a predetermined pattern assigned to that unitary memory.

Therefore, if this second embodiment is shown in a conceptional block diagram similar to FIG. 1, it can be shown in completely the same diagram as Figure. Accordingly, there will be omitted an overall explanation of the conceptional operation with reference to FIG. 1, and conceptional explanation will be made only on the memory 3.

Similarly to the first embodiment, the excitations of the simple cells of the first and second cell blocks 2A and 2B are transmitted to the memory 3. As mentioned above, since each pair of simple cells are interconnected so that one simple cell of each simple cell pair receives at its input an output of the other simple, and the simple cells are connected in a connection pattern corresponding to a predetermined pattern, such as a connection pattern for a straight line, a connection pattern for a triangle, a connection pattern for a rectangle, and the like. Further, the excitation of the simple cells cf the memory 3 having the above mentioned connection patterns are respectively fed back to the corresponding simple cells of the first and second cell blocks 2A and 2B.

Thus, the first and second cell blocks 2A and 2B and the memory 3 are mutually influenced each other, so that certain simple cells in the memory 3 connected in the connection pattern corresponding to the reacting pattern of the cell blocks, ultimately continue to oscillate. The ultimately oscillating simple cells in the memory 3 will give recognition of the given pattern.

Figure 21:
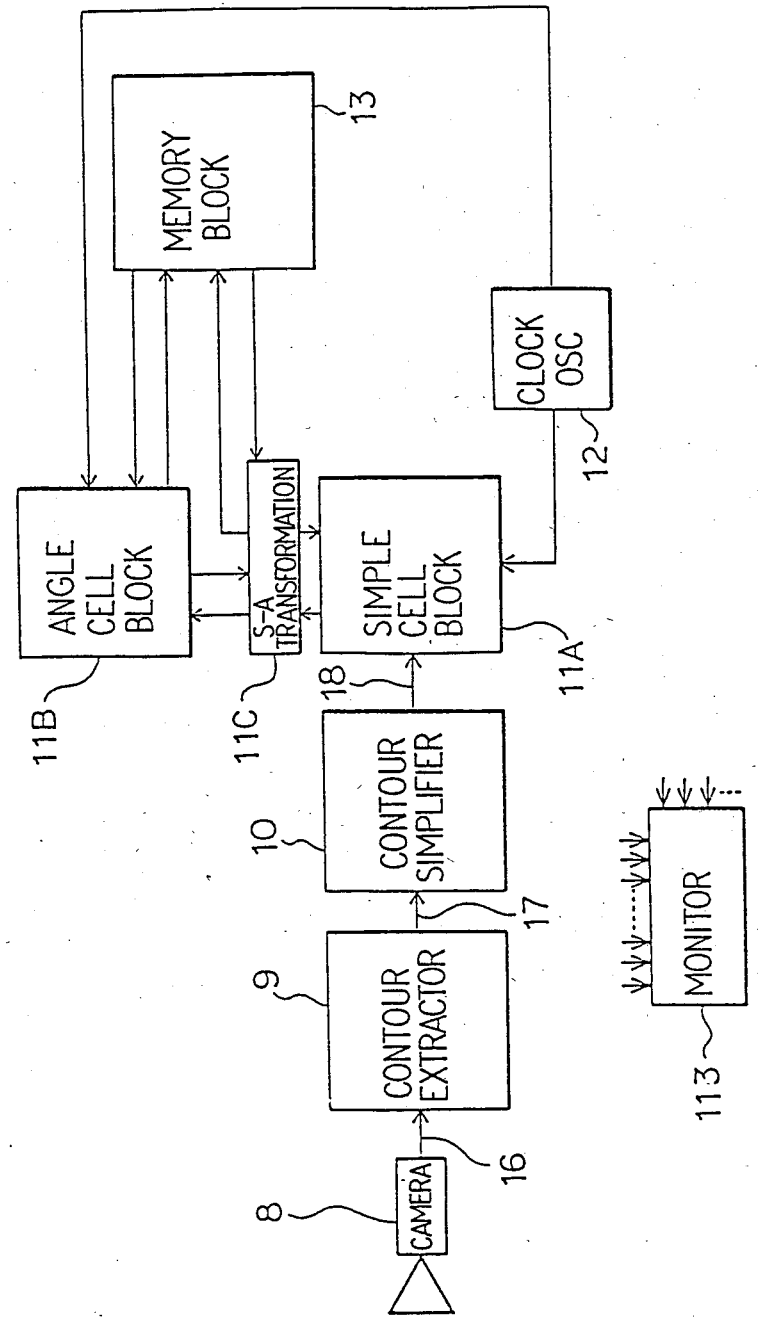
FIG. 21 is a block diagram showing the basic structure of a second embodiment of a pattern recognition system in accordance with the present invention.

Referring to FIG. 21, there is shown the basic structure of the above mentioned second embodiment of the pattern recognition system in accordance with the present invention. In FIG. 21, elements similar to those shown in FIG. 2 are given the Reference Numerals and explanation thereof will be omitted. As seen from comparison between FIGS. 2 and 21, the second embodiment of the pattern recognition system does not include the memory clock 14. Therefore, it should be understood that the second embodiment has a structure similar to that of the first embodiment, except that memory clock 14 is not provided and the memory has a plurality of simple cells connected in the above mentioned manner. For simplification of explanation, explanation will be made only on portions different from the first embodiment.

Figure 22A:
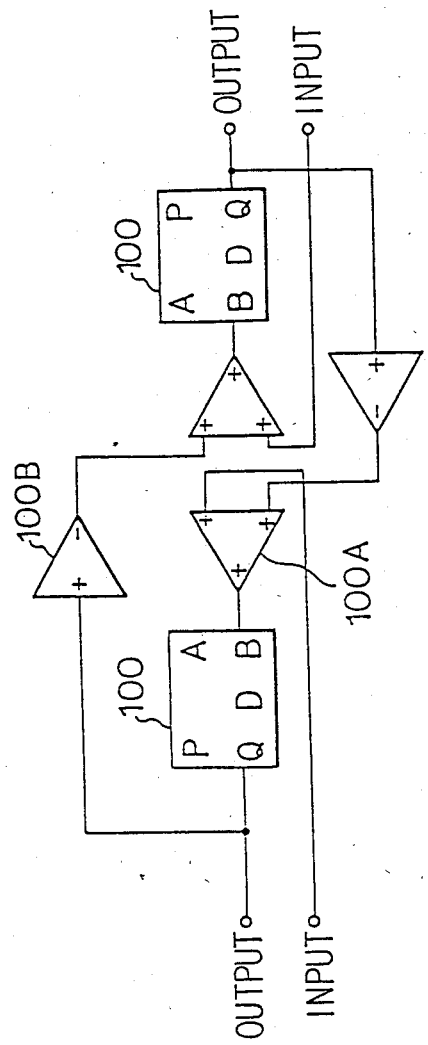
FIG. 22A, 22B and 22C circuit diagrams of three typical memory oscillators.
Figure 22B:
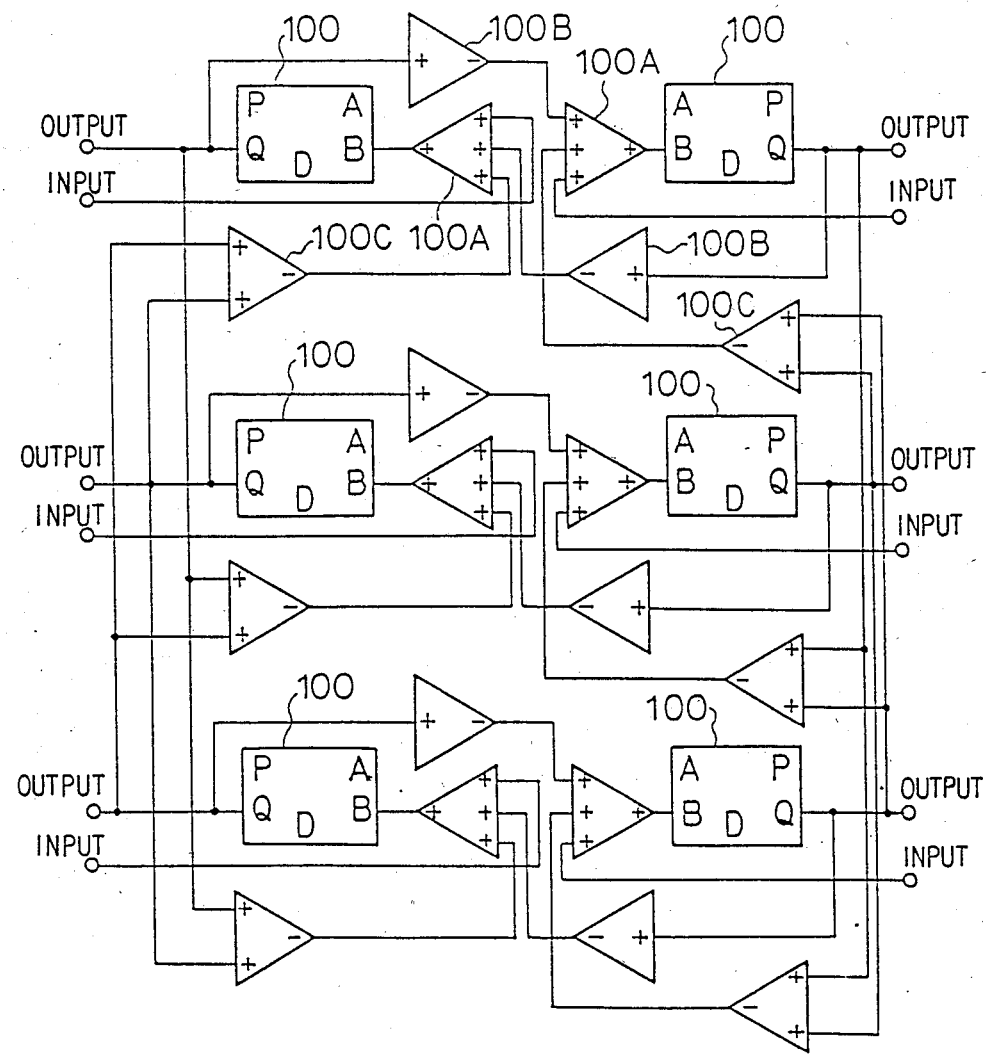
Figure 22C:
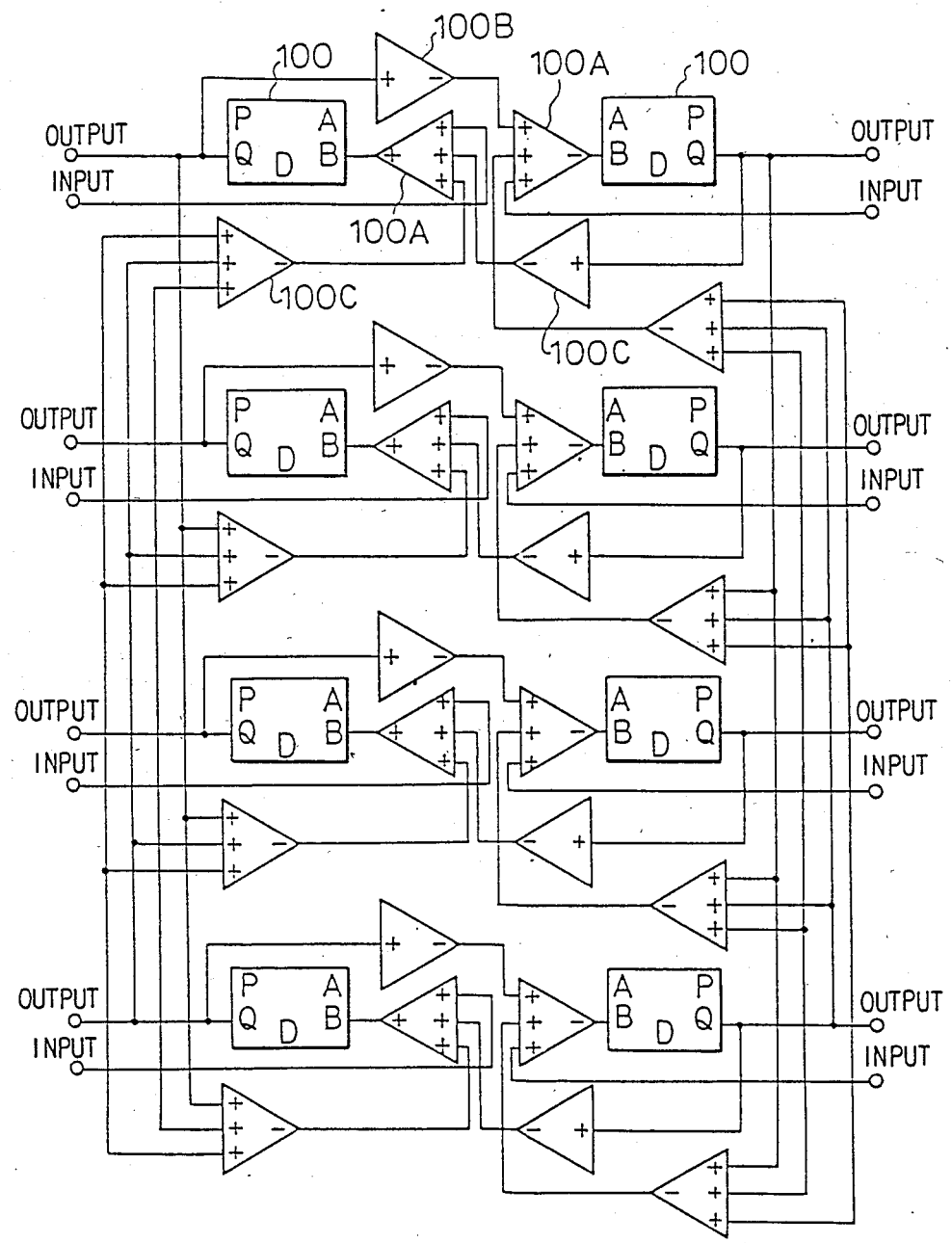

Referring to FIGS. 22A, 22B and 22C, there are shown internal connection diagrams of the memory oscillator 100. As seen from Figures the memory oscillator is composed of unitary oscillators.

FIG. 22A illustrates the connection pattern for the memory oscillator for recognition of a bar or straight line. This memory oscillator is composed of a pair of unitary oscillators, in which the B input of each unitary oscillator is coupled to an output of a two-input analog adder 100A. This adder receives at its one input the output of point gate (or the bus line) and at its other input the Q output of the other unitary oscillator through an invertor 100B. Further, the Q outputs of the respective unitary oscillators are in the form of a pulse and inputted to the simple cell pulse PS generator 101 and the angle cell pulse $P_A$ generator 102.

Figure 23:
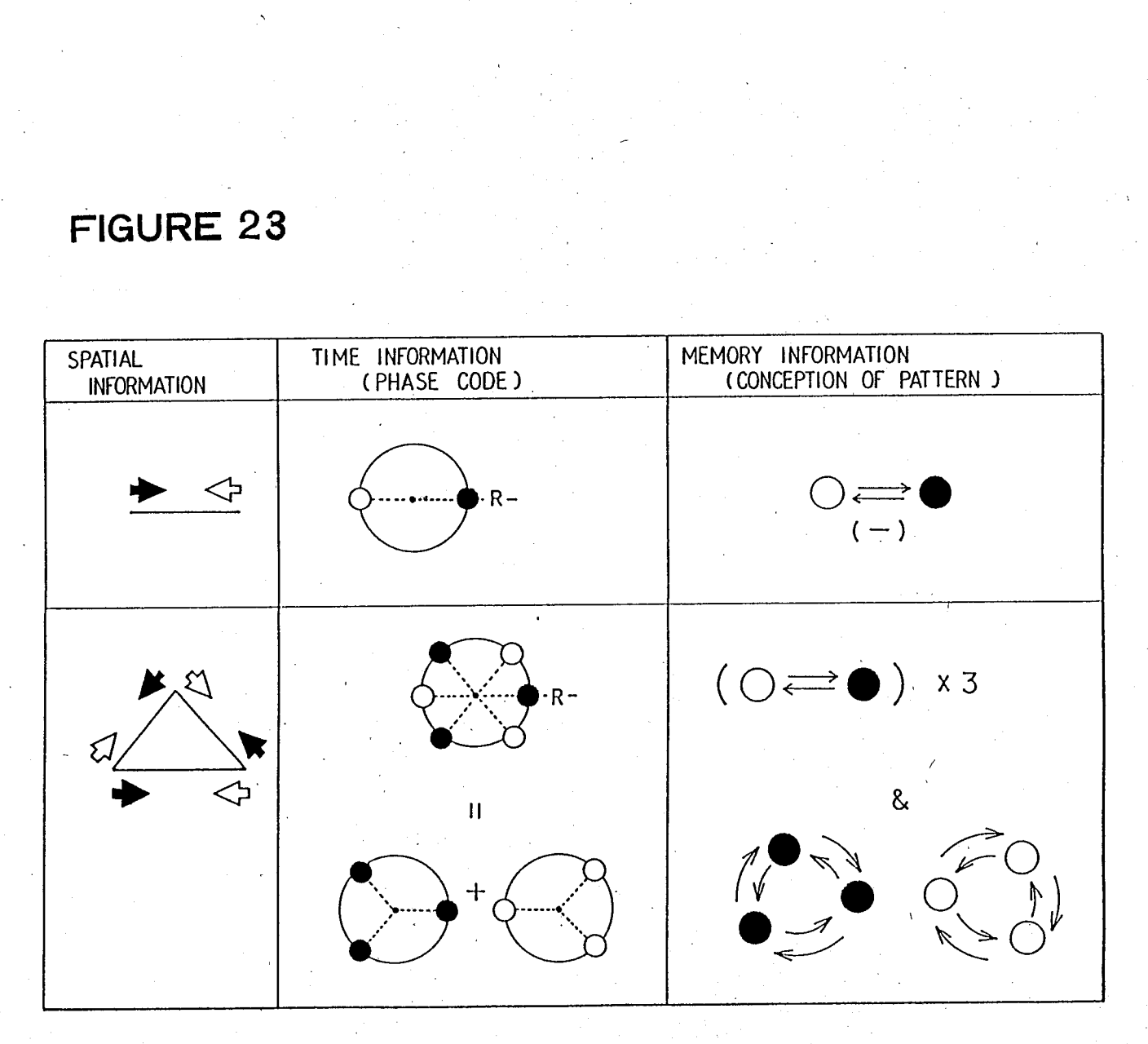

Now, the meaning for the connection shown in FIG. 22A will be explained with reference to FIG. 23. In FIG. 23, a pair of black arrow and white arrow opposing to each other show that the directions are deviated from each other by 180° and a pair of black dot and white dot opposing to each other show that the phases are deviated from each other by 180°.

Assuming that a pattern shown in an upper stage of the "SPATIAL INFORMATION" in FIG. 23 is derived by the angle cell block, there are excited a pair of cells having a phase deviation of 180° from each other, as shown in an upper stage of the "TIME INFORMATION" in FIG. 23. Thus, if a pair of signals having a phase deviation of 180° from each other are inputted to the pair of unitary oscillators connected as shown in FIG. 22A, since the Q output of each oscillator is inverted and then inputted to the B input of the other oscillator, the respective inputs of the pair of oscillators will gradually be increased, with the result that the respective outputs of the oscillators are mutually emphasized. Namely the amplitudes of the oscillations are mutually emphasized.

The above mentioned relation is shown in an upper stage of the "MEMORY INFORMATION" in FIG. 23, and the memory information held in the pair of unitary oscillators connected as shown in FIG. 22A.

FIG. 22B illustrates the connection pattern for the memory oscillator for recognition of a triangle. This memory oscillator is composed of three pairs of unitary oscillators, in which the B input of each unitary oscillator is coupled to an output of a three-input analog adder 100A. This adder receives at its first input the output of point gate (or the bus line) and at its second input the Q output of the other unitary oscillator of the same pair through an invertor 100B. In addition, a third input of the adder 100A is connected to an output of a two-input invertor 100C which receives the Q output of the other oscillators located at the same side. Further, the Q outputs of the respective unitary oscillators are in the form of a pulse and inputted to the simple cell pulse $P_S$ generator 101 and the angle cell pulse $P_A$ generator 102.

Next, the meaning for the connection shown in FIG. 22B will be explained with reference to FIG. 23. Assume that a pattern shown in a lower stage of the "SPATIAL INFORMATION" in FIG. 23 is derived by the angle cell block. In the case of a triangle, three corners will produce three pairs of black arrows and white arrows opposing to each other. A total angle of respective angles of these black arrows to a certain reference line are 180° and a total angle of respective angles of these white arrows to a certain reference line are also 180°.

Considering the time axes of these black and white arrows, there is shown a pattern as shown in a lower stage of the "TIME INFORMATION" in FIG. 23. Namely, each pair of black dot and white dot opposing to each other show that the phases are deviated from each other by 180°. Further, considering only the black dots or the white dots, one black dot (white dot) is in equilibrium to a synthesis of the other two black dots (or white dots).

FIG. 22B truly shows this relation The three right-hand oscillators in FIG. 22B correspond to the three black dots (or white dots) and the three lefthand oscillators in FIG. 22B correspond to the three white dots (or black dots). If each pair of cells having a phase deviation of 180° from each other are respectively excited by a pair of signals having a phase deviation of 180° from each other, the respective outputs of the oscillators are mutually emphasized. Namely the amplitudes of the oscillations are mutually emphasized.

Further, since the B input of each unitary oscillator receives an inverted signal of the synthesis of the Q outputs of the other two oscillators at the same side (the right or left side), if the black dots (or the White dots) are in equilibrium, the three oscillators at each side (the right or left side) will be in equilibrium as the whole.

The above mentioned relation is shown in a lower stage of the "MEMORY INFORMATION" in FIG. 23, and the memory information held in the three pair of unitary oscillators connected as shown in FIG. 22B.

FIG. 22C illustrates the connection pattern for the memory oscillator for recognition of a rectangle. This memory oscillator is composed of four pairs of unitary oscillators, in which the B input of each unitary oscillator is coupled to an output of a three-input analog adder 100A. This adder receives at its first input the output of point gate (or the bus line) and at its second input the Q output of the other unitary oscillator of the same pair through an invertor 100B. In addition, a third input of the adder 100A is connected to an output of a three-input invertor 100C which receives the Q output of the other oscillators located at the same side. Further, the Q outputs of the respective unitary oscillators are in the form of a pulse and inputted to the simple cell pulse $P_S$ generator 101 and the angle cell pulse $P_A$ generator 102.

Next, explanation will be made on operation of the above mentioned second embodiment. But, a large portion of the operation is similar to that of the first embodiment. Therefore, explanation will be limited to portion different from the first embodiment.

Figure 24:
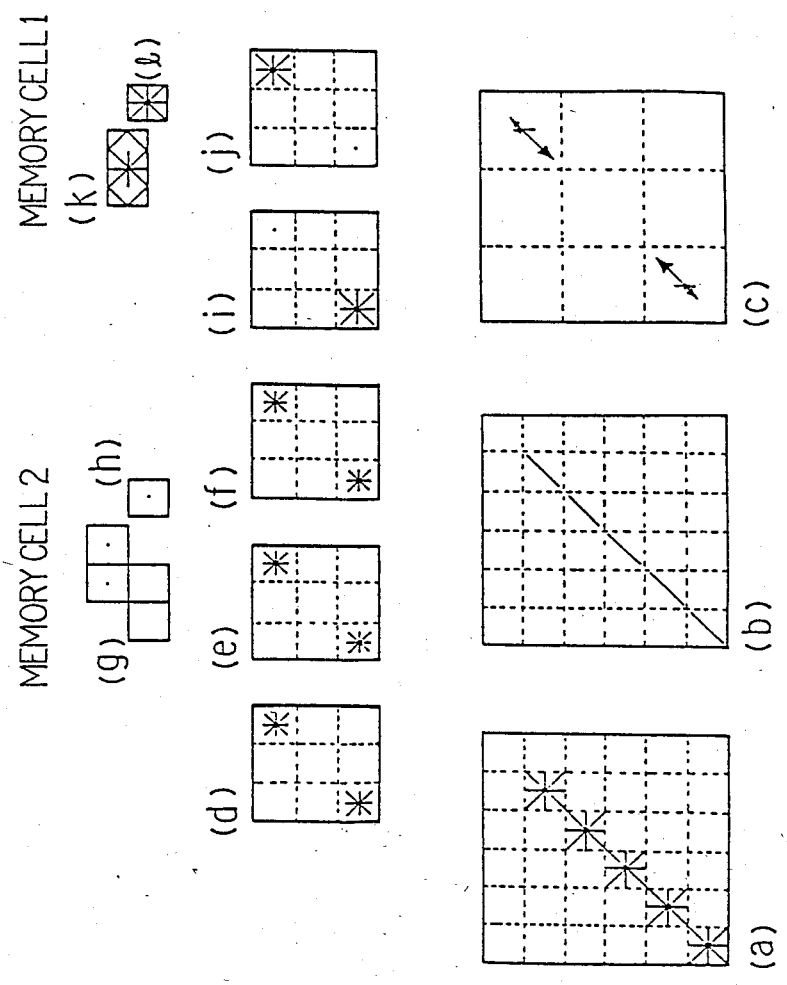
FIG. 24 is an excitation pattern illustrating one example of the operation of the second embodiment of the pattern recognition system.

FIG. 24 illustrates the conditions of various parts observed by the monitor 113, when the pattern recognition system is in operation. FIG. 24 shows one example of a pattern recognition in the case of the second embodiment in which each hyperplane of the simple cell block is composed of 6×6 simple cells, and each hyperplane of the angle cell block is composed of 3×3 simple cells. Further, the processing is executed not to mutually influence in inclined directions of all directions formed by imaginarily connecting all excited angle cells to one another.

Assuming that an inclined line segment pattern as shown in FIG. 24(a) is inputted, the simple cells are excited in an inclined line segment pattern as shown in FIG. 20(b). In FIG. 24(b), the four hyperplanes are shown in a superposed manner so that each of meshes shown in FIG. 24(b) indicate the conditions of four simple cells belonging to the same hypercolumn. Namely, the length and the direction of each line segments indicate the magnitude and the direction of the excitations.

If the exciting pattern of the simple cell block is applied to the angle cell block, the respective angle cells are excited as shown in FIG. 24(C). In FIG. 24(c), the four hyperplanes are shown in a superposed manner, similarly to FIGS. 24(b), so that each of meshes shown in FIG. 24(c) indicates the conditions of four angle cells belonging to the same hypercolumn. In the case of FIG. 24(c), the length and the direction of the line segment depicted in each mesh indicate the magnitude and the direction of the excitation of each angle cell.

The exciting patterns of the simple cell block and the angle cell block are applied to the memory. In the memory, the memory point gates of the item memories coincident with the applied pattern are excited at a portion corresponding to the exciting angle cell as shown in FIGS. 24(d), 24(e) and 24(f).

For example, a memory oscillator connected in a connection pattern corresponding to a L-shaped pattern does not perfectly accord with the input pattern (the inclined line-segment pattern), and therefore, each memory point gate of the item memory are partially opened at consistent portions. However, the associated clock gate is closed as shown in FIG. 24(h), and therefore, the required exciting clock is not supplied, with the result that the memory cell 2 is not excited as shown in FIG. 24(g).

On the other hand, a memory oscillator connected in a connection pattern corresponding to a bar-like pattern perfectly accords with the input pattern (the inclined line-segment pattern), and therefore, each memory point gate of the item memory are excited as shown in FIG. 24(k). In addition, the associated clock gate is opened as shown in FIG. 24(l) so as to supply the required exciting clock.

Thus, only a pattern retained in the memory coincident with the input pattern will remain as the result of competition, and therefore, one recognition is given.

Referring to FIG. 25, there are shown various waveforms at different points in the course of the above mentioned pattern recognition, in which the axis of abscissas is the time axis starting from the detection of the graphic pattern, and the axis of ordinates indicates the amplitude of various signals.

As seen from FIG. 25, the two clocks W and W/2 increase their amplitude with the time elapsing from the start. The simple cell block pulse is excited with a small delay from the increase of the amplitude in the clocks, and the angle cell block pulse is excited with a further delay from the increase of the amplitude in the simple cell block pulse. In the depicted waveform of the angle cell block pulse, three succeedingly appearing pulses having large amplitudes can be found, which correspond to the three exciting angle cells.

For the memory pulse (BAR), the memory clock gate is gradually opened with time, so that the memory cell pulse appears. For the memory pulse (L-shape), on the other hand, the memory clock gate is gradually closed with time, so that the memory pulse finally disappears.

In the above mentioned embodiment, the clock gate and the memory gate are used, but can be omitted. In this case, since the point gate is omitted, the structure of the system can be simplified.

Figure 26:
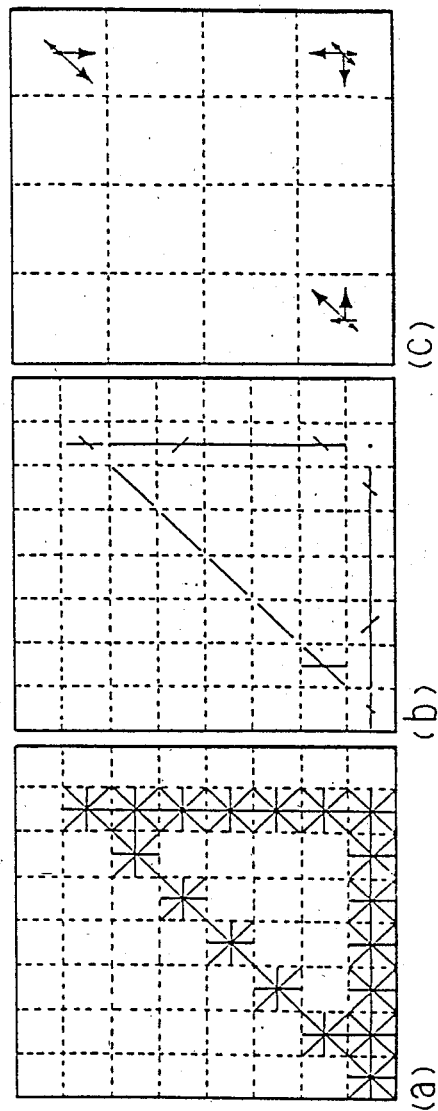
FIG. 26 is a pattern diagram similar to FIG. 24 but illustrating a second example of the operation of the second embodiment of the pattern recognition system.

FIG. 26 illustrates the conditions of various parts in the case of such a modified system.

Assuming that a triangle segment pattern as shown in FIG. 26(a) is inputted, the simple cells are excited in a triangle pattern as shown in FIG. 26(b). In FIG. 26(b), the four hyperplanes are shown in a superposed manner so that each of meshes shown in FIG. 26(b) indicate the conditions of four simple cells belonging to the same hypercolumn. Namely, the length and the direction of the line segment depicted in each mesh indicate the magnitude and the direction of the excitations.

If the exciting pattern of the simple cell block is applied to the angle cell block, the respective angle cells are excited as shown in FIG. 26(C). In FIG. 26(c), the four hyperplanes are shown in a superposed manner, similarly to FIG. 26(b), and the length and the direction of the line segment depicted in each mesh indicate the magnitude and the direction of the excitation of each angle cell.

Figure 27:
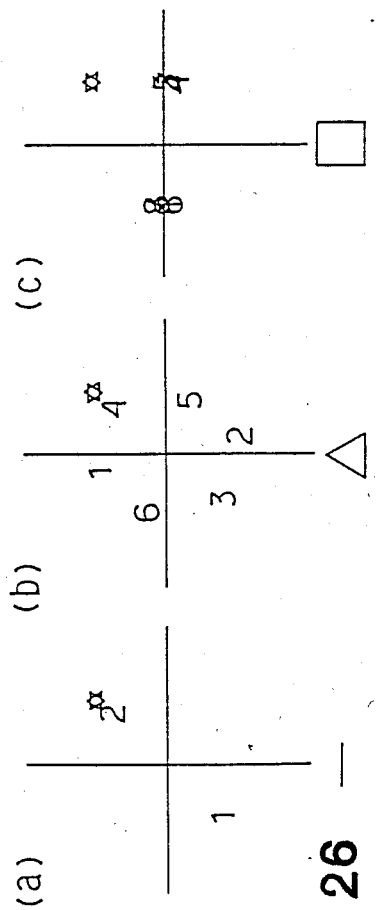
FIG. 27 illustrates the phase relation of memory cells excited by the exciting angle cells in the pattern recognition operation shown in FIG. 26

Examining the phase relation between the memory cells excited by the exciting angle cells, the phase relation between the respective memory oscillators can be as shown in FIG. 27. In FIG. 27, Numerals "1" to "8" indicate the memory oscillators, respectively, and the positions of these Numerals show the phases of the respective memory oscillators, respectively. Namely, the memory oscillator corresponding to the bar-like pattern excited as shown in FIG. 27(a). The memory oscillator corresponding to the triangle pattern excited as shown in FIG. 27(b). The memory oscillator corresponding to the rectangle pattern excited as shown in FIG. 27(c). As seen from FIG. 27(b), the memory oscillators corresponding to the triangle are mutually emphasized in oscillation.

Figure 28:
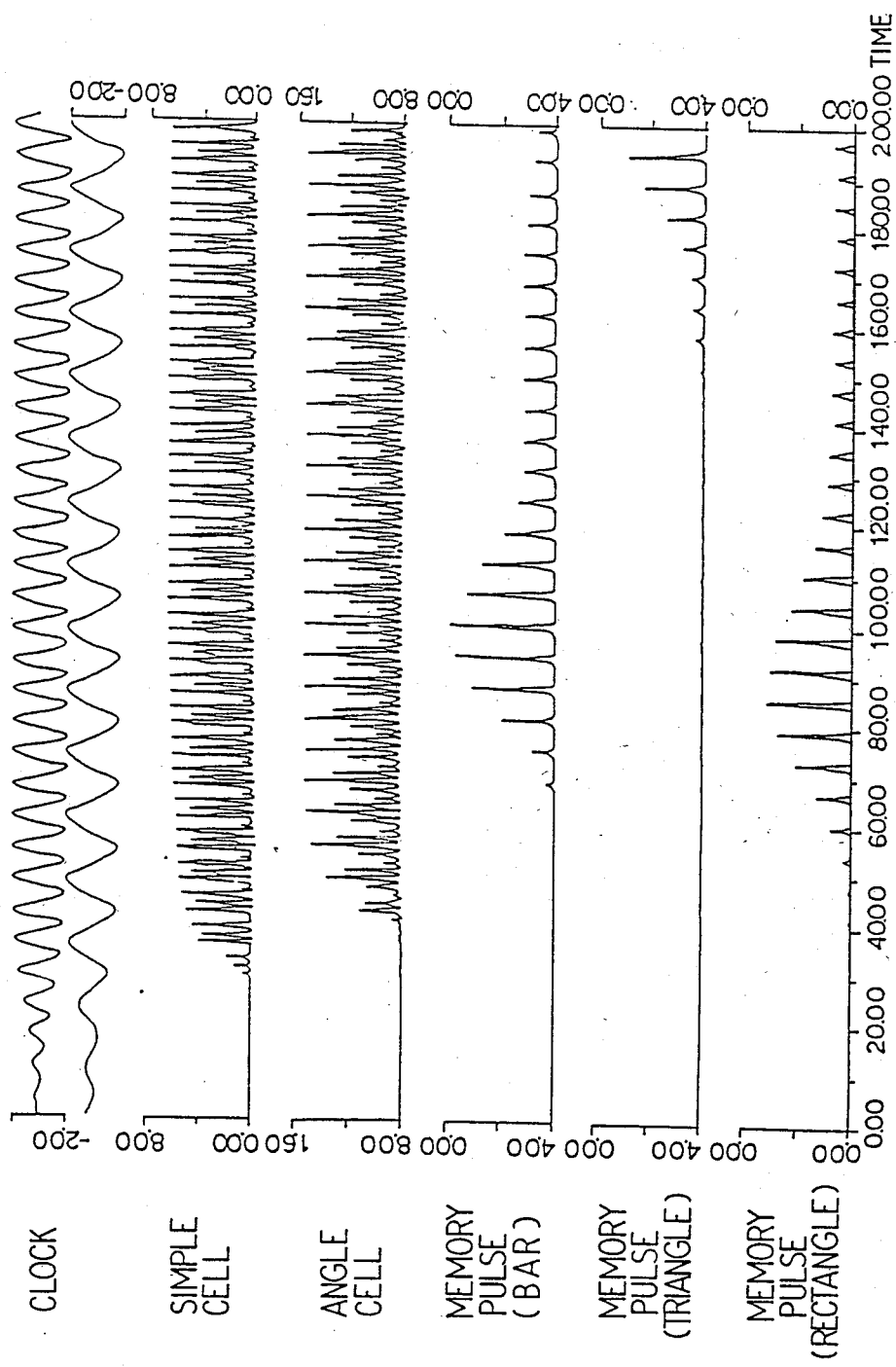
FIG. 28 is a waveform diagram showing signals at various points in the pattern recognition operation shown in FIG. 26.

Referring to FIG. 28, there are shown various waveforms at different points in the course of the above mentioned pattern recognition.

As seen from FIG. 28, for the memory pulse (TRIANGLE), the memory clock gate is gradually opened with time, so that the memory cell pulse appears. For the memory pulse (BAR) and the memory pulse (RECTANGLE), on the other hand, the memory clock gate is gradually closed with time, so that the memory pulse finally disappears.

FIG. 29 illustrates the conditions of various parts in the case of the pattern recognition when a triangle different from the that of FIG. 26.

Assuming that a triangle segment pattern as shown in FIG. 29(a) is inputted, the simple cells are excited in a triangle pattern as shown in FIG. 29(b). If the exciting pattern of the simple cell block is applied to the angle cell block, the respective angle cells are excited as shown in FIG. 29(C).

Examining the phase relation between the memory cells excited by the exciting angle cells, the phase relation between the respective memory oscillators can be as shown in FIG. 30. In FIG. 30, Numerals "5" to "0" indicate the memory oscillators, respectively, and the positions of these Numerals show the phases of the respective memory oscillators, respectively.

Figure 31:
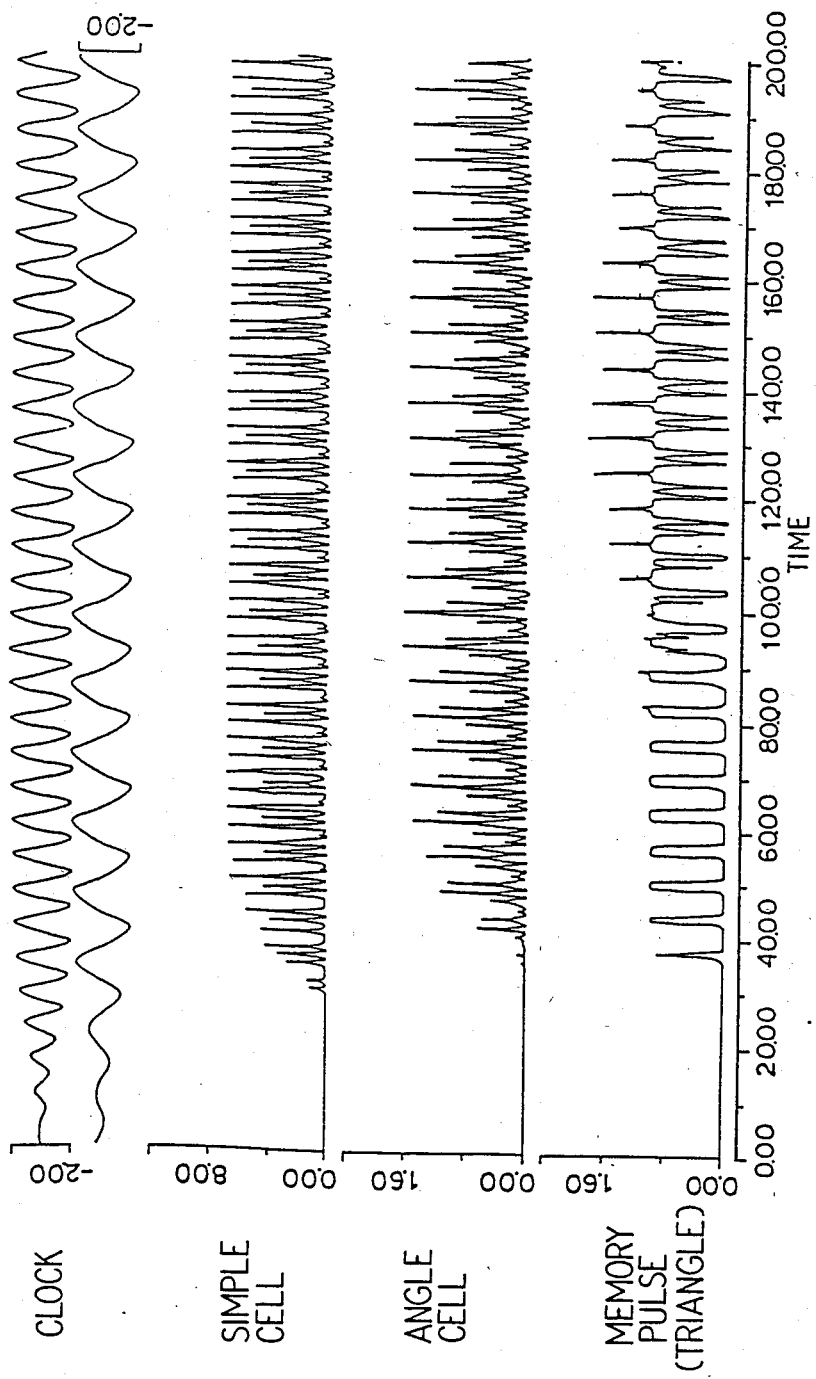
FIG. 31 is a waveform diagram showing signals at various points in the pattern recognition operation shown in FIG. 29.

Referring to FIG. 31, there are shown various waveforms at different points in the course of the above mentioned pattern recognition. For the memory pulse (TRIANGLE), the memory clock gate is gradually opened with time, so that the memory cell pulse is gradually enlarged.

Figure 32:
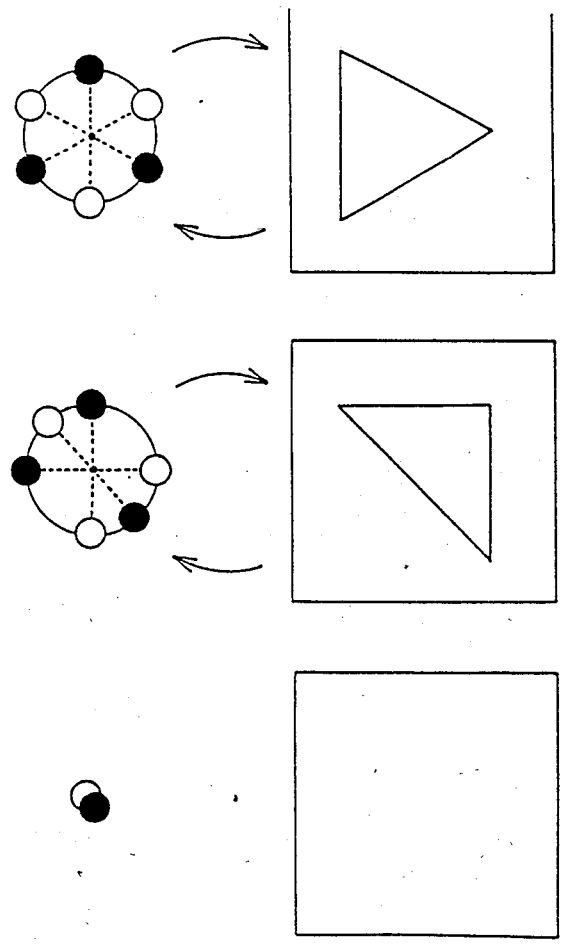
FIG. 32 illustrates some examples of patterns which can be recognized by the second embodiment of the pattern recognition system in accordance with the present invention.

In the above mentioned second embodiment, the memory oscillators connected in correspondence to various patterns make it possible to recognize the corresponding pattern without regards to the position, the size, the rotation and the the degree of analogy, for example, a bar-like pattern as a bar-like pattern, a triangle pattern as a triangle pattern as shown in FIG. 32 and a rectangle pattern as a rectangle pattern.

As seen from the above, the pattern recognition system comprises a number of analog circuits which are driven in perfect parallel, and so, it cannot have a delay in processing, differently from sequential processing executed in digital processors.

In addition, not only existence of dissolved line segments but also position and orientation of ends of the line segments can be recognized so that a higher degree of recognition can be realized.

Even if a given pattern is an ambiguous pattern or a figure whose data is not stored in the memory, any result of recognition can be given by adjusting the clocks supplied to the simple cell block, the angle cell block and the memory block so that these circuits mutually change their conditions.

Since the main parts of the apparatus are constituted by using the unitary oscillators of the same structure, it can have a high reliability. In addition, the above mentioned perfectly parallel operation will decrease the possibility that a partial fault or trouble will greatly influence the result of the whole processing.

In the above embodiments, the unitary oscillator is constituted in the form of a van der pole nonlinear oscillating circuit having a state basic oscillation characteristics, and so, the waveform stability is very excellent. But, the unitary oscillator can be used of other nonlinear circuit types. In addition, the above recognition system is of analog circuit type, but it can be formed of digital circuits capable of computing a nonlinear oscillation.

Further, if there is given a pattern to which two or more interpretations can be made, the system can wonder between those interpretations. This means that it is possible to provide a recognition system which is capable of freely complying with an external condition and which can simulate a waviness in interpretation of a human being.

The invention has thus been shown and described with reference to the specific embodiments. However, it should be noted that the invention is in no way limited to the details of the illustrated structures but changes and modifications may be made within the scope of the appended claims.

We claim:

1. A pattern recognition system comprising:
    a preprocessing unit receiving a given pattern for converting the given pattern into a two-dimensional bit pattern;
    a first cell block having a plurality of layers each of which is composed of a plurality of nonlinear oscillators arranged in a two-dimensional matrix, the nonlinear oscillators in each of the layers being coupled to the preprocessing unit so as to be excited by a corresponding bit of the bit pattern, the nonlinear oscillators in each of the layers being coupled to adjacent nonlinear oscillators in the same layer so as to mutually emphasize the oscillation in a predetermined direction different from those predetermined for the other layers, so that in each of the layers, there are selectively excited the nonlinear oscillators arranged to correspond to a continuous line segment formed in the two-dimensional bit pattern and aligned in a direction coincident with the excitation emphasizing direction of that layer;

a second cell block having a plurality of layers each of which is composed of a plurality of nonlinear oscillators arranged in a two-dimensional matrix, each of the nonlinear oscillators in each of the layers of said second cell block being coupled to at least one of the plurality of nonlinear oscillators of said first cell block, the nonlinear oscillators in each of the layers being coupled to adjacent nonlinear oscillators in the same layer so as to mutually emphasize the oscillation only in a predetermined orientation different from those predetermined for the other layers, so that in each of the layers, there are selectively excited the nonlinear oscillators corresponding to an end of a continuous line segment formed in the two-dimensional bit pattern and aligned in a direction coincident with the direction of that layer; and a memory composed of a plurality of nonlinear oscillators coupled to the first and second cell blocks and selectively excited by the exciting nonlinear oscillators of the first and second cell blocks, whereby the nonlinear oscillators of the memory corresponding to an exciting pattern of the exciting nonlinear oscillators of the first and second cell blocks oscillate at a frequency inherent to the given pattern.

2. A system claimed in claim 1 wherein the nonlinear oscillators in each layer of the second cell block are coupled to a corresponding group composed of a plurality of nonlinear oscillators of a corresponding layer of the first cell block.

3. A pattern recognition system comprising:

a preprocessing unit receiving a given pattern for converting the given pattern into a two-dimensional bit pattern;

a first cell block having a plurality of layers each of which is composed of a plurality of nonlinear oscillators arranged in a two-dimensional matrix, the nonlinear oscillators in each of the layers being coupled to the preprocessing unit so as to be excited by a corresponding bit of the bit pattern, the nonlinear oscillators in each of the layers being coupled to adjacent nonlinear oscillators in the same layer so as to mutually emphasize the oscillation in a predetermined direction different from those predetermined for the other layers, so that in each of the layers, there are selectively excited the nonlinear oscillators arranged to correspond to a continuous line segment formed in the two-dimensional bit pattern and aligned in a direction coincident with the excitation emphasizing direction of that layer;

a second cell block having a plurality of layers each of which is composed of a plurality of nonlinear oscillators arranged in a two-dimensional matrix, each of the nonlinear oscillators in each of the layers of said second cellblock being coupled to at least one of the plurality of nonlinear oscillators of said first cell block, the nonlinear oscillators in each of the layers being coupled to adjacent nonlinear oscillators in the same layer so as to mutually emphasize the oscillation only in a predetermined orientation different from those predetermined for the other layers, so that in each of the layers, there are selectively excited the nonlinear oscillators corresponding to an end of a continuous line segment formed in the two-dimensional bit pattern and aligned in a direction coincident with the direction of that layer; and a memory composed of a plurality of nonlinear oscillators coupled to the first and second cell blocks and selectively excited by the exciting nonlinear oscillators of the first and second cell blocks, the plurality of nonlinear oscillators being divided into a plurality of pairs, each pair of nonlinear oscillators being interconnected so that one nonlinear oscillator of each nonlinear oscillator pair receives at its input an output of the other nonlinear oscillator, and the nonlinear oscillators in each unitary memory being connected in a connection pattern corresponding to a predetermined pattern aligned to that unitary memory, whereby the unitary memory having the nonlinear oscillators connected in a connection pattern corresponding to an given pattern oscillates at a frequency inherent to the given pattern.

4. A system claimed in claim 3 wherein the nonlinear oscillators in each layer of the second cell block are coupled to a corresponding group composed of a plurality of nonlinear oscillators of a corresponding layer of the first cell block.

* * * * *

UNITED STATES PATENT AND TRADEMARK OFFICE
CERTIFICATE OF CORRECTION

PATENT NO. : 4,888,814
DATED : December 19, 1989
INVENTOR(S) : Youko YAMAGUCHI and Hiroshi SHIMIZU It is certified that error appears in the above-identified patent and that said Letters Patent is hereby corrected as shown below:

Column 28, line 37, Claim 3, change "aligned" to -- assigned --.

Signed and Sealed this

Sixteenth Day of July, 1991

Attest:

HARRY F. MANBECK, JR.

Attesting Officer

Commissioner of Patents and Trademarks